US012315268B2

(12) United States Patent  
Gariel et al.

(10) Patent No.: US 12,315,268 B2  
(45) Date of Patent: May 27, 2025

(54) VISION-BASED LANDING SYSTEM

(71) Applicant: Joby Aero, Inc., Santa Cruz, CA (US)

(72) Inventors: Maxime Marie Christophe Gariel, San Francisco, CA (US); Ian Baldwin, Pleasanton, CA (US); Brian Shimanuki, San Francisco, CA (US); Rob Timpe, San Francisco, CA (US); Edward Lim, Pacifica, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 296 days.

(21) Appl. No.: 17/864,514

(22) Filed: Jul. 14, 2022

(65) Prior Publication Data

US 2023/0023069 A1  Jan. 26, 2023

Related U.S. Application Data

(60) Provisional application No. 63/225,045, filed on Jul. 23, 2021.

(51) Int. Cl.
*G06V 20/56* (2022.01)
*B64D 45/04* (2006.01)
(Continued)

(52) U.S. Cl.
CPC .......... *G06V 20/588* (2022.01); *B64D 45/04* (2013.01); *B64D 47/08* (2013.01); *G05D 1/106* (2019.05);
(Continued)

(58) Field of Classification Search
CPC ...... B64D 45/04; B64D 47/08; G05D 1/0676; G05D 1/106; G06T 7/74;
(Continued)

(56) References Cited

U.S. PATENT DOCUMENTS 3,610,930 A * 10/1971 Lacy .................... G01S 1/02
359/220.1
4,419,079 A * 12/1983 Georges .............. G01C 23/005
340/978
(Continued)

OTHER PUBLICATIONS

Enhanced flight vision system—Wikipedia page. Page is dated May 7, 2021. Page was accessed on Sep. 1, 2022 at: https://web.archive.org/web/20210507000206/https://en.wikipedia.org/wiki/Enhanced_flight_vision_system.
(Continued)

*Primary Examiner* — Congvan Tran
(74) *Attorney, Agent, or Firm* — Dority & Manning, P.A.

(57) ABSTRACT

A system includes one or more cameras configured to attach to an aircraft and capture a plurality of images. The plurality of images includes a first image including a runway and a subsequently captured second image including the runway. The system includes an aircraft computing system configured to identify common features in the first and second images, determine changes in locations of the common features between the first and second images, and determine a predicted landing location of the aircraft in the second image based on the changes in locations of the common features. The aircraft computing system is configured to abort landing on the runway based on the predicted landing location relative to the runway.

30 Claims, 15 Drawing Sheets

(51) Int. Cl.
    B64D 47/08    (2006.01)
    G05D 1/00     (2006.01)
    G06T 7/73     (2017.01)
    G06V 20/17    (2022.01)
(52) U.S. Cl.
    CPC .............. *G06T 7/74* (2017.01); *G06V 20/17* (2022.01); *G06T 2207/10032* (2013.01)
(58) Field of Classification Search
    CPC .......... G06T 2207/10032; G06V 20/17; G06V 20/588; B64U 70/60
    See application file for complete search history.

(56) References Cited

U.S. PATENT DOCUMENTS

| | | | |
|---|---|---|---|
| 10,202,204 B1* | 2/2019 | Daidzic | G08G 5/025 |
| 2012/0035789 A1* | 2/2012 | He | G01C 23/005 |
| | | | 701/16 |
| 2015/0019048 A1* | 1/2015 | Krishna | G08G 5/04 |
| | | | 701/16 |
| 2016/0093225 A1* | 3/2016 | Williams | G01C 21/20 |
| | | | 701/17 |
| 2018/0197301 A1* | 7/2018 | Anderson | G08G 5/06 |
| 2020/0168111 A1* | 5/2020 | Veyrac | G06F 18/214 |
| 2021/0319709 A1* | 10/2021 | Rose | G06T 3/4015 |
| 2023/0023670 A1* | 1/2023 | Stoschek | G08G 5/0021 |

OTHER PUBLICATIONS

Jbara, Khaled Abu; Alheadary, Wael; Sundaramorthi, Ganesh; Claudel, Christian, A Robust Vision-based Runway Detection and Tracking Algorithm for Automatic UAV Landing, 2015 International Conference on Unmanned Aircraft Systems (ICUAS). Dated Jun. 9-12, 2015.

Liu, Changjiang; Cheng, Irene; Basu, Anup, Real-Time Runway Detection for Infrared Aerial Image Using Synthetic Vision and an ROI Based Level Set Method, Remote Sens. 2018, 10(10), 1544. Available at https://doi.org/10.3390/rs10101544.

Marianandam, Peter Arun; Ghose, D., Vision Based Alignment to Runway during Approach for Landing of Fixed wing UAVs, IFAC Proceedings vols. vol. 47, Issue 1, 2014, pp. 470-476. Available at https://doi.org/10.3182/20140313-3-IN-3024.00197. Dated Mar. 13-15, 2014.

Moore, Andrew J.; Schubert, Matthew; Dolph, Chester; Woodell, Glenn, Machine Vision Identification of Airport Runways with Visible and Infrared Videos, Journal of Aerospace Information Systems vol. 13, No. 7, Jul. 2016.

* cited by examiner

VISION-BASED LANDING SYSTEM

CROSS-REFERENCE TO RELATED APPLICATION

This application claims the benefit of U.S. Provisional Application No. 63/225,045, filed on Jul. 23, 2021. The disclosure of the above application is incorporated herein by reference in its entirety.

FIELD

The present disclosure relates to unmanned aircraft control.

BACKGROUND

An unmanned aircraft system may include an unmanned aircraft (e.g., without an onboard pilot) and other unmanned aircraft system components, such as a ground-based controller. In some implementations, an unmanned aircraft may include sensors, a software stack, actuators, a communication system, and other components. The sensors may provide information about the aircraft state. The unmanned aircraft control system may execute the software stack to control the aircraft actuators based on acquired sensor information in order to pilot the aircraft during a planned mission. The communication system may provide for control and data exchange during a mission. An unmanned aircraft may implement various degrees of autonomy during a mission. In some cases, an unmanned aircraft may be controlled by a human operator at a ground control station.

SUMMARY

In one example, a system comprises one or more cameras configured to attach to an aircraft and capture a plurality of images. The plurality of images includes a first image including a runway and a subsequently captured second image including the runway. The system comprises an aircraft computing system configured to identify common features in the first and second images, determine changes in locations of the common features between the first and second images, and determine a predicted landing location of the aircraft in the second image based on the changes in locations of the common features. The aircraft computing system is configured to abort landing on the runway based on the predicted landing location relative to the runway.

In one example, a non-transitory computer-readable medium comprises computer-executable instructions configured to cause one or more processing units of an aircraft to capture a plurality of images from one or more cameras attached to the aircraft. The plurality of images includes a first image including a runway and a subsequently captured second image including the runway. The instructions are further configured to identify common features in the first and second images, determine changes in locations of the common features between the first and second images, and determine a predicted landing location of the aircraft in the second image based on the changes in locations of the common features. The instructions are further configured to abort landing on the runway based on the predicted landing location relative to the runway.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
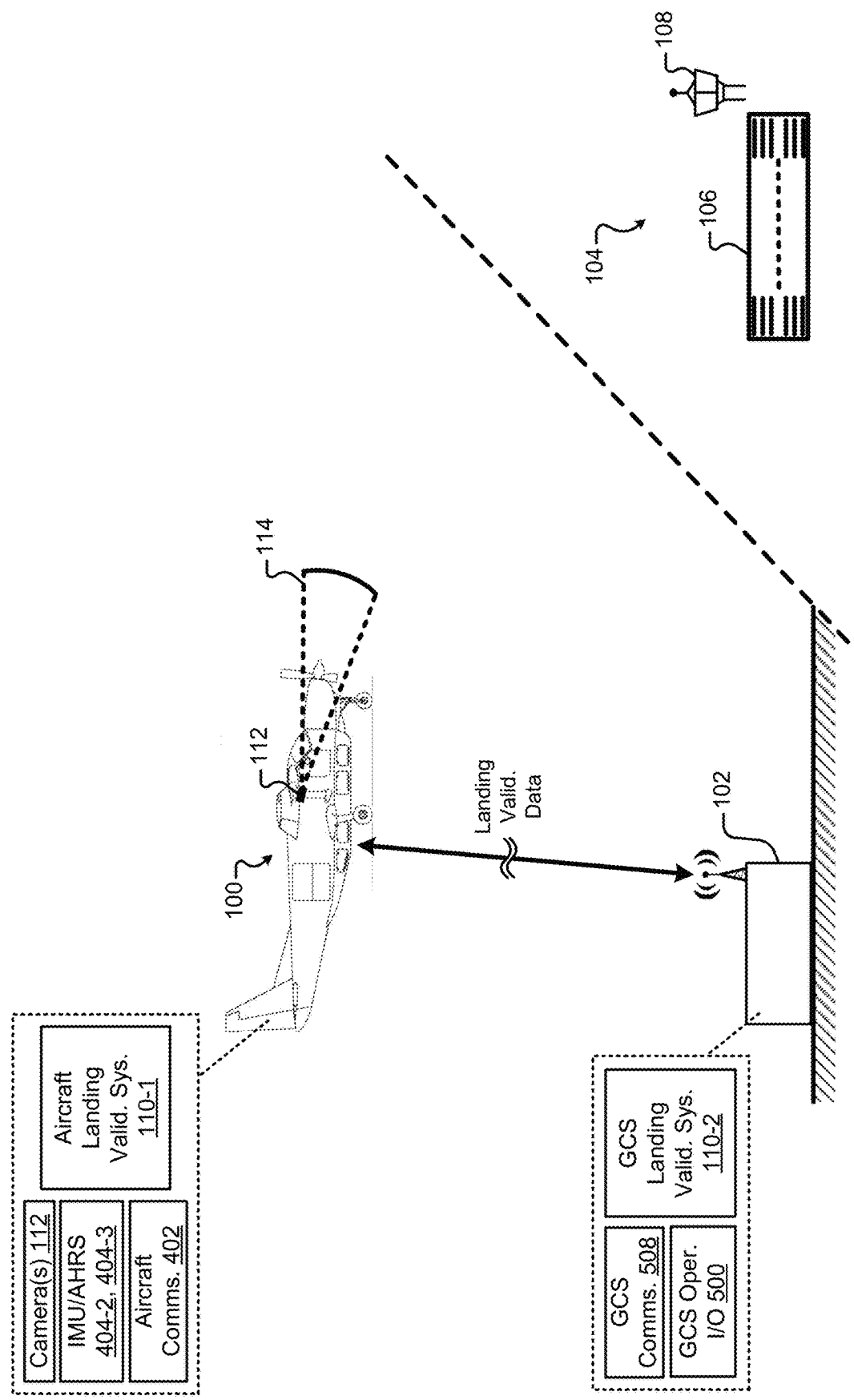
FIG. 1 illustrates an example environment that includes an aircraft, a ground control station (GCS), and a destination airport that includes a runway.

FIG. 1 illustrates an example environment that includes an aircraft 100, a ground control station (GCS) 102, and a destination airport 104 that includes a runway 106. The aircraft 100 may communicate with the GCS 102 via a data connection, a radio relay, or other communication channel. In some implementations, a remote operator (e.g., a remote pilot) in the GCS 102 may monitor/control the aircraft 100. For example, a remote operator (e.g., a remote pilot) in the GCS 102 may send flight commands to the aircraft 100 and receive data from the aircraft 100 and other sources. In some cases, the GCS 102 may be referred to as an aircraft operations center (AOC). In some cases, the remote operator may be referred to as a remote pilot, depending on the operator's qualifications and responsibilities. In some implementations, the aircraft 100 may communicate with an air traffic control (ATC) facility 108 (e.g., an ATC tower) at the destination airport 104.

Figure 4:
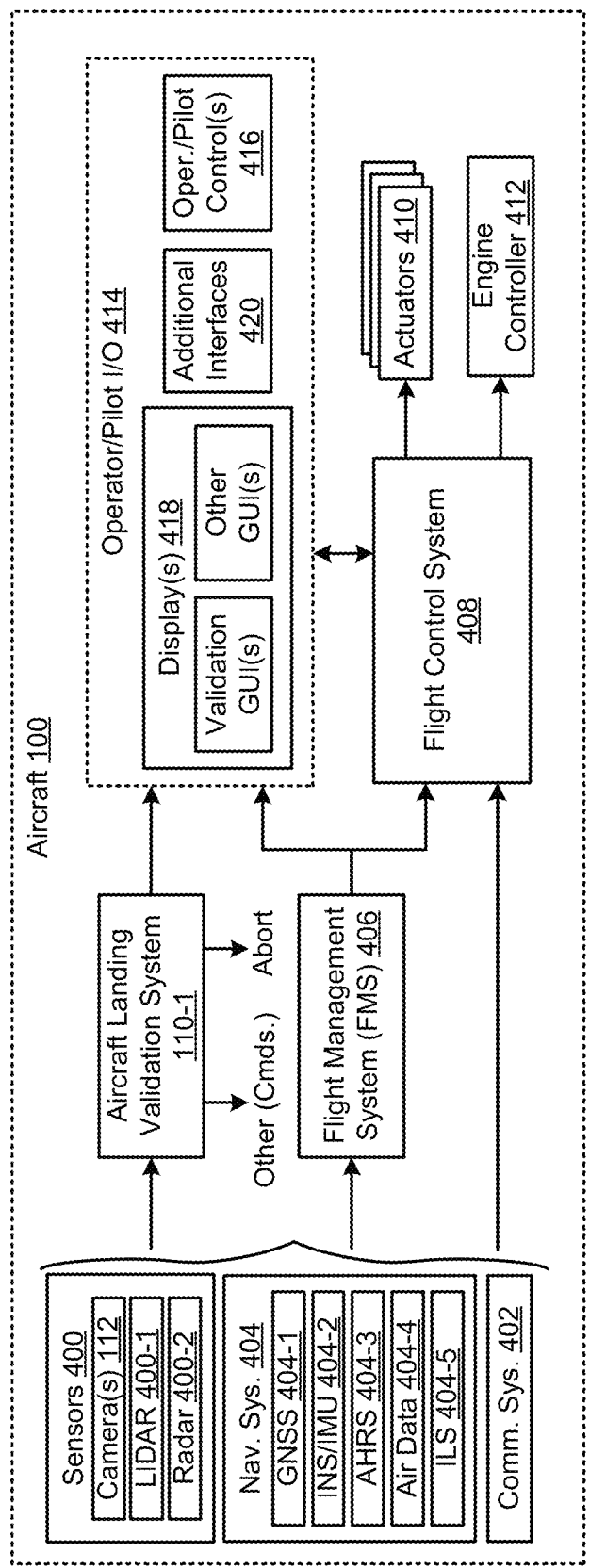
FIG. 4 is a functional block diagram of an example aircraft (e.g., an unmanned aircraft).
Figure 5:
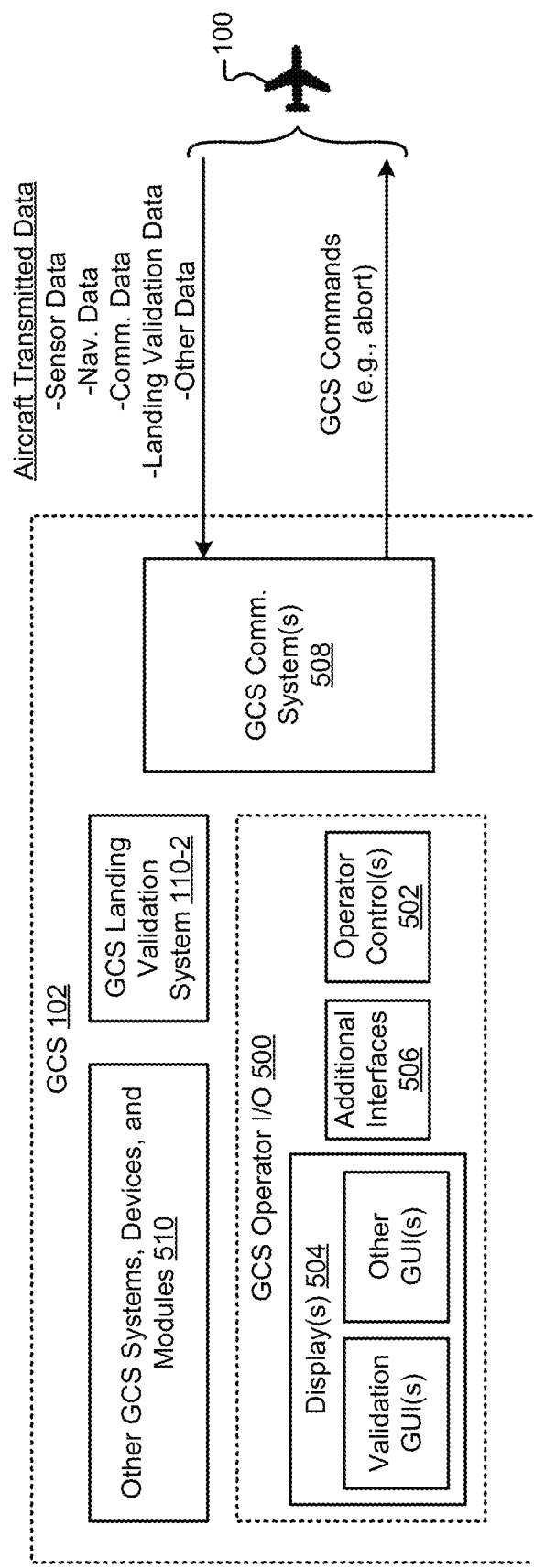
FIG. 5 illustrates an example GCS that includes a GCS landing validation system.
Figure 6:
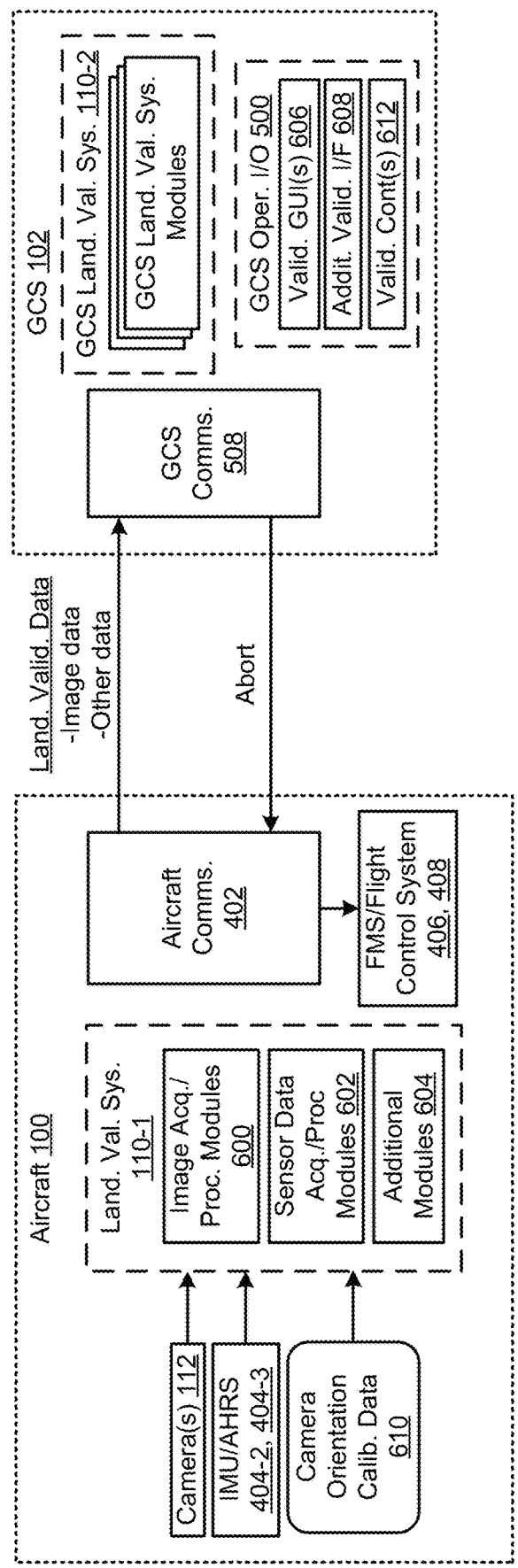
FIG. 6 illustrates example landing validation system components included in the aircraft and the GCS.

A landing validation system 110 ("validation system 110") of the present disclosure may assist an aircraft operator (e.g., a remote operator/pilot) in validating a landing location of the aircraft 100 during a runway approach. Additionally, or alternatively, the validation system 110 may assist an automated landing system (e.g., a flight control system 408) during landing of the aircraft 100. Features of the validation system 110 may be implemented by the aircraft 100 and/or the GCS 102. For example, as illustrated in FIG. 1, FIG. 4, and FIG. 6, the aircraft 100 may include an aircraft landing validation system 110-1 (e.g., an aircraft validation/computing system) that implements components of the overall validation system 110 on the aircraft 100. As another example, as illustrated in FIG. 1, FIG. 5, and FIG. 6, the GCS 102 may include a GCS landing validation system 110-2 ("GCS validation system 110-2" or "ground-based computing system") that implements components of the overall validation system 110 in the GCS 102. As described herein, the aircraft 100 and the GCS 102 may implement the validation system features to different extents, depending on the implementation.

The aircraft 100 may include one or more cameras 112 that acquire images of the runway 106 during approach. The aircraft validation system 110-1 may process images acquired by the camera(s) 112 and generate landing validation data that indicates a predicted landing location on the runway 106. In some implementations, the aircraft validation system 110-1 may include additional sensors that generate data (e.g., rotational orientation data) used to process the images and generate the landing validation data. For example, the aircraft validation system 110-1 may use orientation sensors (e.g., attitude sensors), such as an inertial measurement unit (IMU) 404-2 or attitude and heading reference system (AHRS) 404-3, to determine the rotational orientation of the aircraft 100 associated with the images (e.g., the rotational orientation at the time the images were taken). The landing validation data may include a variety of data, such as an image of the runway and a rendered predicted landing location (referred to also as a "rendered landing zone") (e.g., see FIG. 3 and FIG. 15). In some implementations, the landing validation data may include runway feature data indicating the location of various runway features in an image, such as a centerline, runway numbers, runway markers, and runway thresholds (e.g., see FIG. 15).

Figure 3:
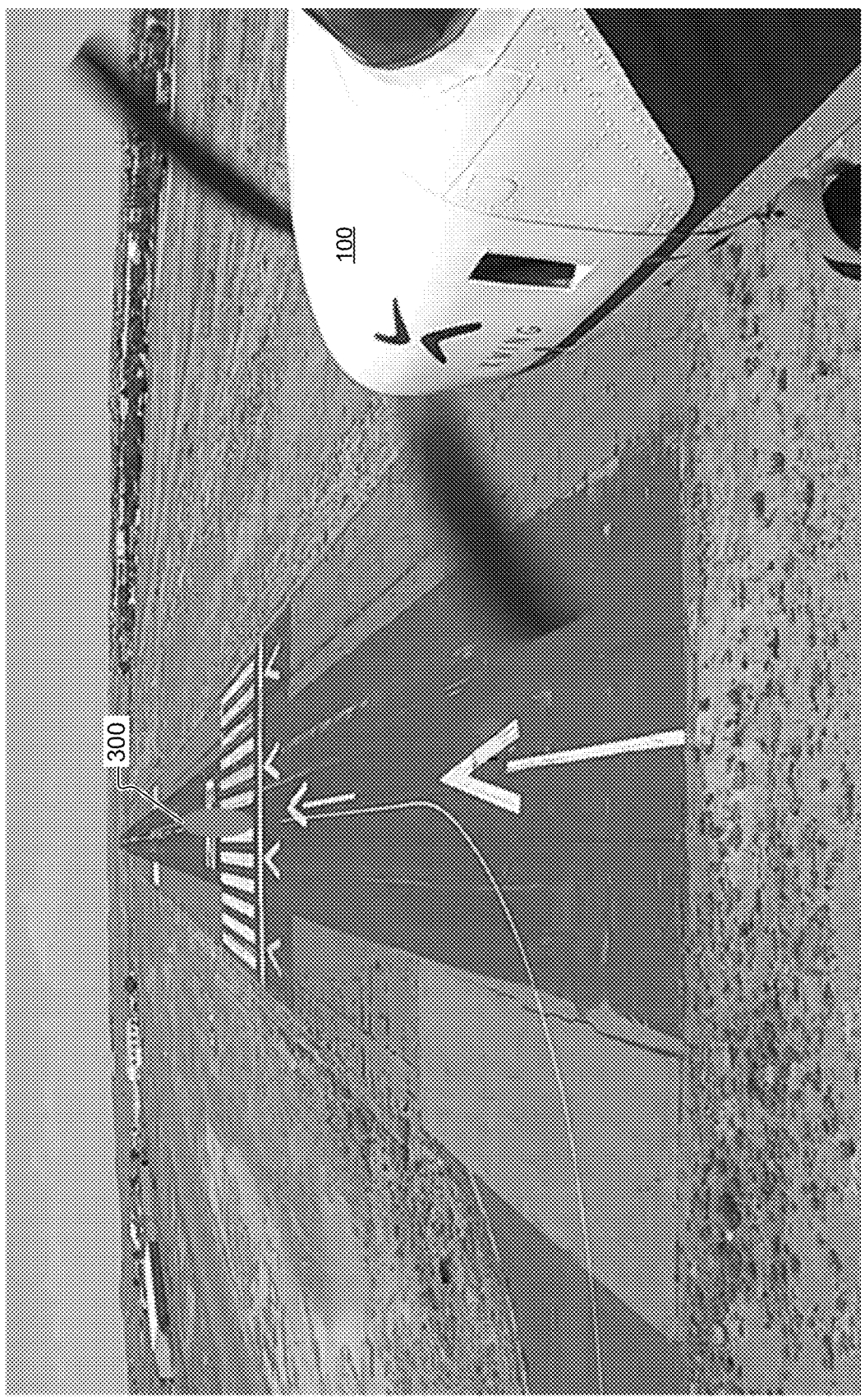
FIG. 3 illustrates an example predicted landing zone.

The aircraft 100 may transmit the landing validation data to the GCS 102. The GCS validation system 110-2 may generate a landing validation interface ("validation interface") for the remote operator based on the received landing validation data. For example, the GCS validation system 110-2 may render a graphical user interface (GUI) that indicates a predicted landing location/zone at which the aircraft 100 may land. An example validation interface, referred to herein as a "landing validation GUI," is illustrated in FIG. 3. The example landing validation GUI of FIG. 3 illustrates an example screenshot of a video/image stream that may be updated (e.g., in real-time) based on video, images, and/or landing validation data being received at the GCS 102 from the aircraft 100.

A remote operator in the GCS 102 may observe the landing validation GUI during the aircraft approach in order to visually verify that the aircraft 100 is on the correct landing trajectory. The operator may abort the landing in cases where the validation GUI indicates that the aircraft 100 is on an incorrect trajectory, such as when the predicted landing zone is not centered on the runway 106 at a proper landing location (e.g., a correct distance from the threshold). In some implementations, the validation system 110 may automatically abort the landing (e.g., without operator input) based on the location of the predicted landing zone.

The validation system 110 of the present disclosure may be used by a remote operator or an autonomous aircraft to validate a landing location. In some implementations, the validation system 110 may be used by a remote operator and/or autonomous aircraft as the primary system for determining/validating a landing location. In some implementations, the validation system 110 may be used by a remote operator and/or autonomous aircraft as a backup system for determining/validating a landing location. In some implementations, the validation system 110 may be used along with other sensors and systems to validate a landing location. For example, the validation system 110 may be used along with a global positioning system (GPS) receiver, an instrument landing system (ILS), and/or other positioning systems. In some cases, the validation system 110 may provide an independent validation of the landing location predicted by the other positioning systems. For example, in a situation with a remote operator, the validation system 110 may provide additional visual verification that the aircraft (e.g., on autopilot) is on a correct/incorrect approach (e.g., at a correct/incorrect approach angle). In a specific example, the validation system 110 may be used to detect inaccuracies and/or errors in the other aircraft sensors/systems. In these specific implementations, the validation system 110 may be used as a backup in the case other sensors/systems are providing unreliable information and/or the other sensors are malfunctioning.

FIG. 1 illustrates example aircraft components and example GCS components. The aircraft 100 of FIG. 1 includes a camera 112 mounted to the aircraft 100 (e.g., mounted to a wing strut). The camera 112 may have a field of view 114 that is sufficient for acquiring images that include the runway 106 and a surrounding area during approach. Although the aircraft 100 of FIG. 1 illustrates a single camera 112 mounted to the aircraft wing strut, an aircraft may include one or more cameras mounted in similar/different locations. The aircraft 100 may include one or more types of cameras. For example, the aircraft 100 may include one or more electro-optical (EO) cameras, one or more infrared (IR) cameras, and/or one or more time of flight (TOF) cameras.

In some implementations, the aircraft 100 may include one or more sensors/systems that determine rotational orientation of the aircraft 100, such as roll, pitch, and/or yaw/heading. For example, the aircraft 100 may include an IMU 404-2, AHRS 404-3, magnetometer, and/or other systems/sensors that determine orientation of the aircraft 100. The aircraft validation system 110-1 may acquire orientation data using one or more of the sensors/systems. Although the aircraft validation system 110-1 may acquire rotational orientation data from one or more sources, in some cases herein, the aircraft validation system 110-1 is described as acquiring rotational orientation data for image processing from an IMU.

The aircraft 100 may include an aircraft communication system 402 that transmits the landing validation data to a GCS communication system 508. The GCS validation system 110-2 may generate a landing validation interface (e.g., a validation GUI) on the GCS operator input/output (I/O) 500. For example, the GCS operator I/O 500 may include a display that displays the validation GUI. The GCS operator I/O 500 may also include operator controls (e.g., manual buttons and/or a touchscreen) that allow a remote operator to abort the landing in cases where the landing validation data indicates that the aircraft's predicted landing location is incorrect (e.g., outside of normal landing parameters). The landing abort command may be transmitted from the GCS 102 to the aircraft 100, which may then abort the landing.

Figure 2:
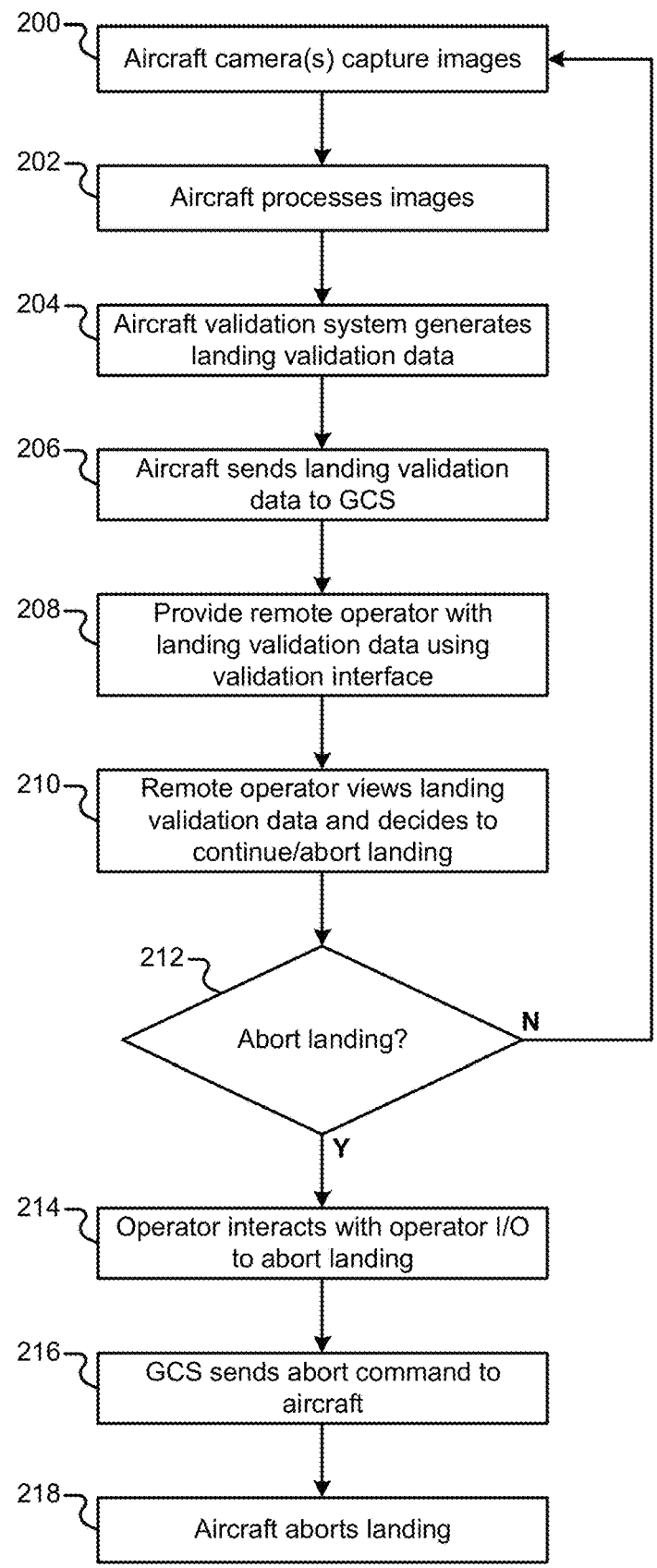
FIG. 2 illustrates a method that describes operation of an example landing validation system of the present disclosure.

FIG. 2 illustrates a method that describes operation of an example validation system 110 of the present disclosure. In some implementations, the method of FIG. 2 may be performed while the aircraft 100 is autolanding (e.g., during an autopilot-controlled landing). In some implementations, a remote operator in the GCS 102 may monitor/control the aircraft 100 during the method of FIG. 2. In some implementations, the method of FIG. 2 may be triggered by one or more conditions. For example, the method of FIG. 2 may be triggered in response to the autopilot entering a final approach for landing, the aircraft 100 tracking an instrument landing system (ILS) glide slope, and/or the aircraft 100 dropping below a threshold above ground level (AGL) altitude.

In block 200, one or more aircraft cameras 112 capture images while the aircraft 100 is approaching the runway at an approach angle (e.g., on glide slope). The images may include the runway 106 on which the aircraft 100 is landing. In some cases, the images may include a horizon and/or other surrounding natural features (e.g., lake, river, and/or ocean shores). Additionally, the images may include objects near the runway 106. Example natural/artificial objects may include, but are not limited to, buildings (e.g., airport hangars, residential buildings, etc.), vegetation (e.g., trees, bushes, etc.), terrain features (e.g., rocks or ground features), stationary/moving aircraft, and airport vehicles. The images may include a variety of detectable image features that may be detected and tracked from image to image. For example, image features may include changes in color/brightness in portions of the images. In a specific example, an image feature may be a tip of a building's roof against the sky. Various image feature detection algorithms may match and track features from image to image. In some implementations, some detected features may be filtered out (e.g., some moving features maybe filtered out).

In block 202, the aircraft validation system 110-1 processes the acquired images. For example, the aircraft validation system 110-1 may process a sequence of images (e.g., 2 or more images) to determine how features in the images have moved over time due to aircraft movement. The aircraft validation system 110-1 may determine the landing validation data (e.g., a predicted landing location/zone) based on the processed images. Although processing a sequence of two images is described herein, the landing validation system of the present disclosure may generate landing validation data by processing a larger sequence of images (e.g., three or more images).

In some implementations, the validation system 110 may apply criteria for the selection of images. For example, the validation system 110 may select images based on the timing between the images. In some implementations, the validation system 110 may select images so that the images have as many common features as possible between the two images, but sufficient time difference between the images to allow for meaningful results. For example, the movement of the features should be larger than the resolution of the image. In one case, it may be desirable to have as many features as possible moving by a "significant" number of pixels (e.g., greater than a threshold number of pixels) to provide an accurate estimate. In some implementations, an aircraft that is flying faster may require a shorter interval between images. In the case of turbulent conditions, additional images may be used to improve the quality of the solution. The additional images may add a delay in processing, but may reduce the noise of the solution and provide a more stable solution. In some implementations, the aircraft validation system 110-1 may pre-process the images to remove distortions in the individual images. In some implementations, the aircraft validation system 110-1 may perform calibration operations (e.g., intrinsic and extrinsic calibration of images).

In some implementations, the aircraft validation system 110-1 may reproject (e.g., "reorient") images relative to one another during image processing. For example, the aircraft validation system 110-1 may reproject the images for processing based on the rotational orientation of the aircraft 100 at the time the images were acquired. In one example, the aircraft validation system 110-1 may reproject the images such that the images represent a view (e.g., a projection) of the runway and surrounding area from the same rotational orientation. In a specific example illustrated in FIGS. 10A-11B, the first image in a sequence of two images is reprojected to the orientation of the aircraft at the time the second more current image was acquired.

In block 202, the aircraft validation system 110-1 may identify features in the images. For example, the aircraft validation system 110-1 may identify features that are common among the sequence of images (e.g., see FIGS. 12A-12B). The aircraft validation system 110-1 may use one or more feature detection algorithms to detect the features. For example, the aircraft validation system 110-1 may use corner detection operations (e.g., Harris, Shi-Tomasi, etc.) to detect features.

The aircraft validation system 110-1 may then determine a change in locations of the common features. Based on the change in locations of the common features, the aircraft validation system 110-1 may determine the predicted landing zone in the image. In one example described herein (e.g., see FIGS. 12A-13), the aircraft validation system 110-1 may determine lines associated with the motion of each common feature. The aircraft validation system 110-1 may then determine an invariant point/region in the image as a location associated with the intersection of the lines (e.g., an "intersection region"). In some implementations, the invariant point in the image may have an associated uncertainty region. For example, due to resolution of the pixels, noise may be introduced to the point where all the lines are supposed to intersect. In this case, the invariant point may be associated with a surrounding region of uncertainty around the invariant point (e.g., due to the uncertainty in line intersection). Although implementations described herein may make use of conventional sparse features with an associated "descriptor" (Binary Robust Independent Elementary Features (BRIEF), Oriented FAST and rotated BRIEF (ORB), etc.), the same processes may make use of domain-specific learned feature detectors. Such detectors (e.g., SuperPoint, Learned-Invariant Feature Detectors (LIFT), Repeatable and Reliable Detector and Descriptor (R2D2), and others) may focus on learning germane interest points and descriptive context for specific applications, which in this case may include detecting (and associating) relevant local features to be used for scene analysis.

In block 204, the aircraft validation system 110-1 may generate landing validation data based on the processed images. In general, the landing validation data may include any data that indicates the predicted landing location/zone in the acquired images. In implementations where the aircraft validation system 110-1 determines an invariant point, the landing validation data may indicate that the predicted landing zone is located at/around the determined invariant point.

Landing validation data may include a variety of types of data, which may depend on the implementation of the validation system 110. In some implementations, landing validation data may include one or more images acquired by the cameras 112. In some implementations, the landing validation data may include one or more annotated images. For example, the landing validation data may include an image acquired by the camera 112 that is annotated with a rendered predicted landing zone. In some implementations, the landing validation data may include other types of data that indicate the location of the predicted landing zone in the image. For example, the landing validation data may include image coordinates (e.g., X, Y coordinates) that define the location of the landing zone. In some cases, the landing validation data may also include data indicating a size, shape, or other properties of the predicted landing zone that indicate how the landing zone should be rendered at the GCS 102. In some implementations, the landing validation data (e.g., images) may be compressed to aid in efficient transmission. In some implementations, the rendered zone may include a best estimate of the invariant point (e.g., a place where the aircraft 100 is most likely to land). The uncertainty in the prediction may be represented graphically in some implementations. For example, the uncertainty may be represented with one or more rendered shapes (e.g., one or more ellipses) and/or colors that represent various levels of probability. The size/colors of the shapes may vary (e.g., smaller/larger, red/green, etc.), depending on the levels of uncertainty.

Figure 15:
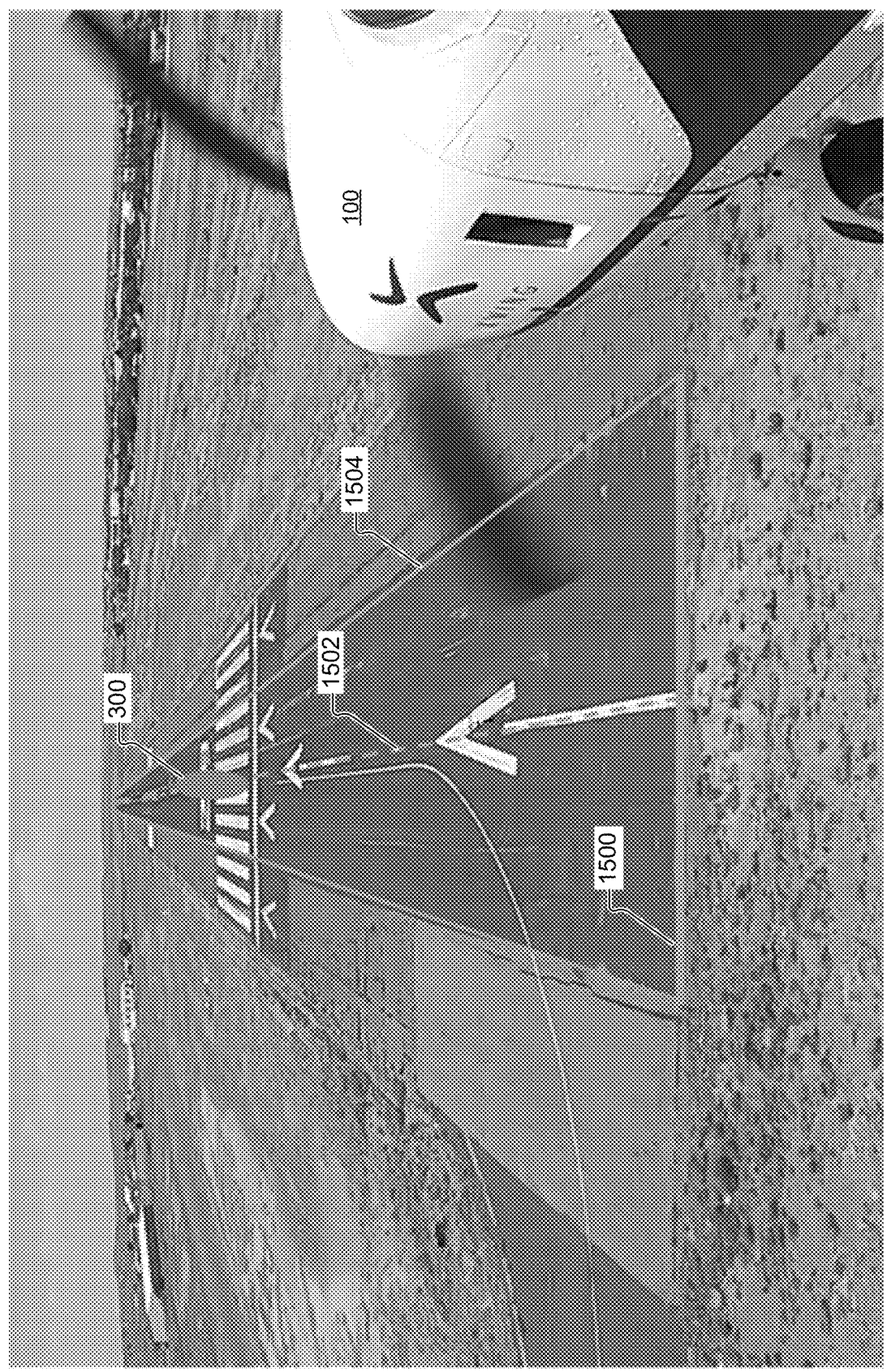
FIG. 15 illustrates example runway renderings.

In some implementations, the validation data may include runway data. For example, the validation data may include an annotated image of the runway 106 and/or other data associated with runway features, such as a runway centerline, runway threshold, and/or runway edge(s). Example runway renderings are illustrated in FIG. 15.

In block 206, the aircraft communication system 402 sends the landing validation data to the GCS 102. In block 208, the GCS validation system 110-2 provides the remote operator with the landing validation data in a landing validation interface. For example, the GCS validation system 110-2 may render a landing validation GUI on a display. The landing validation GUI may include an image/video feed from the aircraft camera 112 along with a rendered predicted landing zone.

FIG. 3 illustrates an example predicted landing zone GUI element 300 ("predicted landing zone 300"). The predicted landing zone 300 may include an area on the image that indicates a probable landing location. The predicated landing zone 300 may indicate a predicted landing location, assuming that the current approach conditions (e.g., approach angle and velocity) are maintained. The GCS 102 may receive updated landing validation data over time and update the predicted landing zone 300 in response to the newly received landing validation data. Note that the predicted landing zone 300 may cover an area of the image. In some implementations, the area covered by the rendered zone may indicate an area in which touchdown is greater than a specified threshold of certainty (e.g., 95% certainty or greater).

Although the validation interface may render a landing zone as illustrated in FIG. 3, the validation interface may convey the predicted landing zone to a remote operator using other renderings, such as other graphics, images, text, numbers, and/or symbols. In some implementations, the validation interface may include additional text that provides a variety of information, such as a probability associated with certainty of the landing zone and/or an amount of deviation from the centerline. In some implementations, the color of the rendered zone may change, depending on location. For example, the rendered zone may be green/red if the zone is located on/outside of an appropriate landing location.

In block 210, a remote operator in the GCS 102 may view the landing validation data and decide whether to continue the landing or abort the landing. For example, the operator may decide to continue the landing when the predicted landing zone is located in a desired touch-down zone on the runway. The operator may decide to abort the landing when the predicted landing zone is located outside of the desired touch-down zone (e.g., displaced in an incorrect manner relative to the threshold/centerline). A variety of renderings may cause the landing to be aborted. In some implementations, an invariant point located outside of the desired touch down zone may cause the landing to be aborted. For example, an invariant point to either side of the runway, below a desired touch-down zone (e.g., landing too short), and/or above a desired touch-down zone (e.g., landing too long) may cause an aborted landing. Note that the touch-down zone dimensions may be a function of the runway size. For example, a larger runway may have a larger desired touch down zone. In some implementations, the size of the rendered zone may change. For example, a larger rendered zone may indicate uncertainty due to an insufficient number of features and/or a lack of spatial distribution of the features. If the rendered zone and/or the invariant point are moving too much during landing, the aircraft 100 may be experiencing turbulence and may transition to using more images and filtering during processing. Alternatively, if the rendered zone and invariant point are stable and centered in the desired touch down zone, the landing may proceed.

In some implementations, the GCS validation interface may include additional/alternative interface components other than a validation GUI. For example, the validation interface may include a validation audio interface, such as voice feedback and/or other sounds (e.g., landing confirmation or abort recommendation sounds). As another example, the validation system 110 may provide other visual feedback, such as flashing lights that indicate landing confirmation/abort recommendations. As another example, the validation system 110 may provide tactile/haptic feedback that indicates confirmation/abort recommendations for the landing. For example, the validation system 110 may actuate vibration of the operator controls or other device(s) that the operator is touching and/or wearing (e.g., a watch) to recommend the landing be aborted.

In block 212, if the operator decides to continue landing, the aircraft validation system 110-1 and the GCS validation system 110-2 may continue acquiring images and providing the remote operator with landing validation data in blocks 200-210. For example, the validation GUI may be refreshed and updated with new images and new rendered zones while continuing the landing. In some implementations, the aircraft validation system 110-1 may generate data according to the image capture frequency of the cameras (e.g., 30 frames per second). In some implementations, the data transmitted to the GCS 102 may be at a lower frequency (e.g., 1 Hz or less). In implementations where the rendered zone data and video stream are separate data (e.g., instead of an annotated image), there may be synchronization between the video stream and rendered zone at the GCS 102.

If the remote operator decides to abort the landing in block 210, the remote operator may interact with operator I/O 500 to instruct the aircraft 100 to abort the landing in block 214. For example, the operator I/O 500 may include operator input devices that the operator may use to indicate the operator's decision. Example operator I/O 500 may include, but is not limited to, a GUI touchscreen (e.g., a GUI button), a physical button (e.g., a landing abort button), and/or a flight yoke/stick.

In block 216, the GCS communication system 500 may send an abort command to the aircraft 100. The aircraft 100 may abort the landing in block 218 in response to the received abort command. In some implementations, the aircraft 100 may continue landing unless the aircraft receives an abort command from the GCS 102. In some implementations, the GCS 102 may provide data/commands to the aircraft 100 to indicate that the aircraft 100 should continue landing (e.g., a continue landing command). In some implementations, the aircraft 100 and the GCS 102 may be configured to communicate a continue command within a time frame that indicates whether the landing should continue. For example, the GCS 102 may provide a continue command within a specified time frame or altitude range in order to indicate to the aircraft 100 that the landing should continue. Although the operator may determine whether to abort the landing, in some cases, the aircraft/GCS may automatically determine whether to continue/abort the landing based on the processed images and generated landing validation data, as described herein.

If the landing is aborted, the aircraft 100 may execute a missed approach. In some implementations, a missed approach may include a missed approach flight plan and/or procedure that may be loaded into the flight management system (e.g., prior to the final approach). A missed approach plan/procedure may define a climb to an altitude/waypoint, a flight pattern (e.g., a holding pattern), and a subsequent landing procedure. The missed approach plan/procedure may vary depending on the airport, specified rules, and other parameters.

Although the method of FIG. 2 may be implemented in scenarios with a remotely operated aircraft, the landing validation system 110 may be implemented in autonomous aircraft and/or piloted aircraft (e.g., on an aircraft display). As described herein, the aircraft 100 and the GCS 102 may implement the validation system features to different extents. The features of the landing validation system 110 attributed to the aircraft 100 and the GCS 102 herein are only example distributions of the various validation system features. As such, features attributed to the aircraft 100 and GCS 102 herein may be distributed in a different manner in other implementations. For example, in some implementations, the aircraft 100 may transmit images and/or orientation data to the GCS 102 for processing and generation of landing validation data. As another example, the aircraft 100 may acquire the images and the aircraft/GCS 100, 102 may process the images to different extents than explicitly illustrated in FIG. 2. As another example, the aircraft 100 may capture images, process the images, determine validation data, and automatically determine whether to abort the landing based on the landing validation data. The landing may also be aborted based on other/additional data. In one example, the landing may be aborted if an object (e.g., aircraft, animal, or other object) is detected on the runway 106 (e.g., using cameras and/or light detection and ranging systems (LIDAR)). In another example, the landing may be aborted in the case of high winds (e.g., crosswinds) outside of predetermined limits. In another example, the landing may be aborted in the case of malfunctions on the aircraft 100, such as a malfunctioning radar altimeter used to measure altitude above the runway.

FIGS. 4-6 are functional block diagrams of an example aircraft 100 and GCS 102 that include an aircraft validation system 110-1 and an example GCS validation system 110-2, respectively. FIG. 4 is a functional block diagram of an example aircraft 100 (e.g., an unmanned aircraft). The aircraft 100 of FIG. 4 includes: 1) sensors 400 (e.g., cameras 112, LIDAR 400-1, radar 400-2, etc.), 2) communication systems 402, 3) navigation systems 404, 4) a flight management system 406 (FMS 406), 5) a flight control system 408, 6) actuators 410, 7) an engine controller 412, and 8) optional operator input/output (I/O) 414.

The aircraft 100 includes a navigation system 404 that generates navigation data. The navigation data may indicate the location, altitude, velocity, heading, and attitude of the aircraft. The navigation system 404 may include a Global Navigation Satellite System (GNSS) receiver 404-1 that determines the latitude and longitude of the aircraft. In some implementations, the navigation system 404 may include an inertial navigation system (INS) 404-2 that may include an inertial measurement unit (IMU) that provides rotational orientation data (e.g., attitude data) including pitch, roll, yaw, and attitude rate data (e.g., pitch rate, roll rate, yaw rate). In some implementations, the navigation system 404 may include an attitude and heading reference system (AHRS) 404-3 that may provide attitude and heading data for the aircraft. The navigation system 404 may include an air data system 404-4 (e.g., a Pitot-static tube, air data computer, etc.) that may provide airspeed, angle of attack, sideslip angle, altitude, and altitude rate information. The navigation system 404 may include a radar altimeter and/or a laser altimeter to provide Above Ground Level (AGL) altitude information. In some implementations, the navigation system 404 may include an instrument landing system (ILS) 404-5. In some implementations, the navigation system 404 may also include other features, such as differential GPS, Real-Time Kinematics (RTK) GPS, and/or a ground based augmentation system for aircraft landing (GBAS).

The aircraft 100 may include a plurality of sensors 400 that generate sensor data, such as sensor data that can be used to acquire images and detect other aircraft. For example, the aircraft 100 may include one or more radar systems 400-2, one or more electro-optical (E/O) cameras 112, one or more infrared (IR) cameras 112, and/or LIDAR 400-1. The radar systems 400-2 and cameras 112 may detect other aircraft. Additionally, the sensors 400 (e.g., cameras 112 and LIDAR 400-1) may determine whether the runway is clear when approaching for a landing. In some implementations, potential obstacles (e.g., surrounding air traffic and weather) may be identified and tracked using at least one of, onboard and offboard radar, cameras, Automatic Dependent System—Broadcast (ADS-B), Automatic Dependent System—Rebroadcast (ADS-R), Mode C transponder, Mode S transponder, Traffic Collision Avoidance System (TCAS), Traffic Information Service—Broadcast (TIS-B), Flight Information Service—Broadcast (FIS-B), and similar services. The data from these sensors and services may be fused and analyzed to understand and predict the behavior of other aircraft in the air or on the ground.

The aircraft 100 may include camera orientation calibration data 610 ("calibration data") that indicates how the camera(s) 112 is/are oriented relative to an IMU or other orientation sensor/system that generates aircraft orientation data. In the case an IMU is used to indicate aircraft orientation, the calibration data may be referred to as "camera-IMU calibration data." In implementations where an IMU is used to indicate the orientation of the aircraft, the camera-IMU calibration data may indicate the orientation/position of the camera(s) 112 relative to the IMU 404-2. In these implementations, the aircraft validation system 110-1 may determine how the camera 112 moves (e.g., rotates) between images. In some implementations, additional calibration data may include camera properties, such as intrinsic camera properties or other extrinsic calibration properties for the camera 112. The aircraft validation system 110-1 may use the calibration data during image processing (e.g., to reproject the images). In some implementations, instead of generating a priori calibration data (e.g., before takeoff), the aircraft validation system 110-1 may estimate some/all of the data online (e.g., during flight).

The aircraft 100 may include one or more communication systems 402. The communication systems 402 may include a plurality of different communication technologies that provide for a plurality of different types of communication links described herein. For example, the one or more communication systems 402 may include one or more radios and other respective hardware/software configured to provide communications via the specified communication link. The communication systems 402 may operate on a variety of different frequencies. In some implementations, the communication systems 402 may form data links.

The communication systems 402 may include one or more satellite communication systems, one or more ground communication systems, and/or one or more air-to-air communication systems. The one or more satellite communication systems may send/receive data to/from a satellite communication network. Example satellite communication systems may communicate via Inmarsat satellite networks and Iridium satellite networks.

The ground communication systems may communicate with ground-based parties. For example, the aircraft 100 may include a line of sight communication system that includes a radio that may communicate with ground-based line of sight systems (e.g., ground-based line of sight radios). In some implementations, the aircraft 100 may communicate with GCS 102 and/or ground base stations (not illustrated) using a line of sight communication system. Ground base stations may include communication base stations that relay information between the aircraft 100 and GCS 102. In some implementations, the aircraft 100 may include one or more cellular communication systems (e.g., cellular radios and associated hardware/software). A cellular communication system may be configured to communicate with a ground based cellular network. Example cellular networks may include, but are not limited to, 3G networks, 4G networks, and 5G networks. In some implementations, the aircraft 100 may include a very high frequency (VHF) radio communication system. The VHF radio communication system may communicate with ATC 108. In some implementations, the aircraft 100 may include one or more transponders (e.g., Mode C, Mode S, etc.). Example transponders may include transponders that transmit ADS-B data and transmit on the 1090 and 978 MHz bands.

In some implementations, the aircraft 100 may include one or more air-to-air communication systems, such as VHF radio, one or more traffic collision avoidance systems (e.g., TCAS I or TCAS II), high frequency (HF) radio, and satellite communication telephones. The aircraft 100 may relay any of the communications described herein to other aircraft, base stations, the GCS 102, and/or ATC 108.

The aircraft communication systems 402 may transmit/receive a variety of types of data described herein. The types of communications may vary, depending on the party communicating with the aircraft 100. In some implementations, the communication systems 402 may transmit a flight plan data structure to the GCS 102 and/or to the ATC 108. The communication systems 402 may gather a variety of information, such as traffic information (e.g., location and velocity of aircraft), weather information (e.g., wind speed and direction), and notifications about airport/runway closures. In some implementations, a voice connection (e.g., ATC communication over radio VHF) may be converted to text for processing. In some implementations, the aircraft 100 can broadcast their own position and velocity (e.g., to the GCS 102 or other aircraft). Additionally, as described herein, the communication systems 402 may downlink landing validation information, such as rendered zones, images, and other information. The communication systems 402 may also uplink abort commands and/or abort flight patterns for handling by the aircraft 100.

The aircraft 100 may include an FMS 406 that may receive and/or generate one or more flight plan data structures (i.e., flight plan data) that the aircraft 100 may use for navigation. A flight plan data structure may include a sequence of waypoints that each indicate a target location for the aircraft 100 over time. A waypoint may indicate a three-dimensional location in space, such as a latitude, longitude, and altitude (e.g., in meters). Each of the waypoints in the flight plan data structure may also be associated with additional waypoint data, such as a waypoint time (e.g., a target time of arrival at the waypoint) and/or a waypoint speed (e.g., a target airspeed in knots or kilometers per hour). In some implementations, a flight plan data structure may include other trajectory definitions, such as trajectories defined by splines (e.g., instead of discrete waypoints) and/or a Dubins path (e.g., a combination of a straight line and circle arcs). In some implementations, the flight plan data structure may include additional flight parameters, such as a desired flap position. The flight plan data structure may be generated for different phases of flight, such as departure, climb, cruise, descent, approach, and missed approach. In some implementations, a flight plan data structure may specify a flight pattern (e.g., near an airport, landing, departing, etc.).

A remote operator, autopilot, and/or onboard operator/pilot may control the aircraft 100 according to the generated flight plan data structure. For example, a flight plan data structure may be used to land the aircraft, takeoff from a runway, navigate en route to a destination, perform a missed approach, and/or hold the aircraft 100 in a defined space. In some implementations, the flight plan may be displayed to the remote operator on a display so that the remote operator may follow the flight plan.

The FMS/GCS 406, 102 may acquire a variety of types of data for use in generating a flight plan data structure. Example data may include, but is not limited to, sensor data (e.g., vision-based data and radar data), navigation data (e.g., GNSS data and AHRS data), static data from databases (e.g., an obstacle database and/or terrain database), broadcasted data (e.g., weather forecasts and notices to airmen), and manually acquired data (e.g., operator vision, radio communications, and air traffic control inputs). Additionally, the FMS 406 (e.g., an avoidance system) may detect, track, and classify surrounding traffic as well as predict surrounding traffic behavior.

The aircraft 100 includes a flight control system 408 that generates actuator commands based on a flight plan data structure and current operating conditions. The flight control system 408 may include a guidance module, an autopilot system, and an actuator control system. The flight control system illustrated and described herein is only an example flight control system. As such, other flight control systems including additional/alternative components may be implemented according to the techniques of the present disclosure.

The flight control system 408 may generate control commands that control the aircraft 100. For example, the flight control system 408 may generate commands that control the actuators 410 and the engines (e.g., via an engine controller 412). The flight control system 408 may control the aircraft 100 according to remote operator inputs from the GCS operator controls and/or commands generated by the FMS 406 (e.g., autopilot commands). For example, the flight control system 408 may control the aircraft 100 according to flight plan data that is generated remotely by the GCS 102 and/or locally by the FMS 406.

The flight control system 408 may include a guidance module. In some implementations, the guidance module may receive the flight plan data structure and additional information regarding the state of the aircraft 100, such as a current location (e.g., a latitude/longitude/altitude), velocity, and aircraft attitude information. Based on the received information, the guidance module may generate autopilot commands for the flight control system 408. Example autopilot commands may include, but are not limited to, a heading command, a desired airspeed command, a desired altitude command, and a roll command.

The flight control system 408 may include an autopilot system and an actuator control system that control the aircraft based on autopilot commands received from the guidance module. For example, the autopilot system and the actuator control system may output control signals/commands that control actuators (e.g., power lever actuators for one or more engines, elevator actuator, etc.). In some implementations, the aircraft 100 may include an engine controller 412 that controls one or more engines, such as turboprop engines or other engine types. The engine controller 412 may control the engine(s) based on received engine commands, such as a power lever position command. For example, the engine controller 412 may control fuel and other engine parameters to control the engines according to the received engine commands. In some implementations, the engine controller 412 may include a full authority digital engine control (FADEC) that controls the engines. Example engines may include, but are not limited to, a piston engine, turboprop, turbofan, turbojet, jet, and turboshaft. In some implementations, the aircraft 100 may include one or more electric motors (e.g., fixed, tilting, etc.). In some implementations, the aircraft 100 may include a propeller system. Example aircraft may include fixed wing aircraft (e.g., see FIG. 1), rotorcraft, vertical takeoff and landing aircraft (VTOL), and hybrid configurations, such as tilt-wing aircraft and electrical vertical takeoff and landing aircraft (eVTOL).

The autopilot may receive autopilot commands from the FMS 406 and/or the operator controls 416, 502 (e.g., from the GCS and/or an onboard operator/pilot). The autopilot may operate in a plurality of different modes. In one example mode, the autopilot receives data (e.g., a flight plan data structure) from the FMS 406 and the autopilot controls the aircraft 100 according to the data received from the FMS 406. In another mode, a remote operator may use remote operator controls 502 (e.g., on a control panel/screen at the GCS 102) to generate control inputs for the autopilot. For example, the autopilot may receive commands from the remote operator controls 502 that provide the autopilot with at least one of: 1) a desired altitude, 2) a desired heading, 3) yaw damper (e.g., to coordinate the turns with the rudder), 4) a desired airspeed (e.g., using engine control), 5) a desired climb/descent rate, and 6) a desired holding pattern. The autopilot may control the aircraft according to the received commands.

The aircraft 100 may include a plurality of control surfaces. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. Rotorcraft may include other controls/surfaces (e.g., rotor collective, cyclic, and tail rotor). The aircraft 100 can include actuators/linkages that control the control surfaces based on the commands generated by the remote operator controls 502 and/or the autopilot. The actuators and linkages may vary, depending on the type of aircraft.

The GCS/aircraft 102, 100 may include interfaces for the remote/onboard operator/pilot, referred to herein as operator input/output (I/O) devices 414, 500 and/or HMI. The operator I/O 414, 500 may include operator controls 416, 502, one or more displays 418, 504, and additional interfaces 420, 506. The operator controls 416, 502 include devices used by the remote/onboard operator/pilot to control the aircraft, such as a flight yoke, power lever, manual buttons/switches, and other controls. The displays 418, 504 can display one or more GUIs. Additional interfaces 420, 506 may include audio interfaces (e.g., speakers, headphones, microphones, etc.), haptic feedback, and other I/O devices, such as readouts, gauges, and additional interfaces not associated with landing validation.

The displays 418, 504 may include a variety of display technologies and form factors, including, but not limited to: 1) a display screen (i.e., monitor), such as a liquid-crystal display (LCD) or an organic light emitting diode (OLED) display, 2) a head-up display (HUD), 3) a helmet mounted display, 4) a head mounted display, 5) augmented reality glasses/goggles, and/or 6) a standalone computing device (e.g., a tablet computing device). The displays 418, 504 may provide different types of functionality. In some implementations, a display may be referred to as a primary flight display (PFD). The PFD may display a variety of information including, but not limited to, an attitude indicator, an airspeed indicator, an altitude indicator, a vertical speed indicator, a heading, and navigational marker information. In some implementations, a display may be referred to as a multi-function display (MFD). An MFD may refer to an auxiliary display/interface that may display a variety of data, such as a navigation route, in conjunction with a primary flight display. The GCS/aircraft 102, 100 may include different types of displays that include GUIs that are rendered based on a variety of data sources (e.g., sensors, navigation systems, communication systems, operator input, etc.). The different displays and GUIs described herein are only examples.

The aircraft may communicate with the GCS 102 (and ATC 108) through different communications pathways (e.g., radio links, cellular, 5G, satellite, Wi-Fi, etc.). For example, the aircraft 100 may communicate a variety of types of information, such as aircraft health, current location, intension, traffic, and weather information to the remote operator. The remote operator may issue commands to the aircraft 100 via the communication pathway. The aircraft 100 may be an optionally piloted vehicle. In this case, the aircraft 100 may have an operator/pilot in the aircraft. The onboard operator/pilot responsibilities may include monitoring of the autonomous systems and communications. The operator/pilot may have the ability to take control of the aircraft in the event of a failure of the autoflight systems or the loss of communications.

FIG. 5 illustrates an example GCS 102 that includes a GCS validation system 110-2. The GCS 102 also includes GCS operator I/O 500 described herein. The GCS 102 also includes GCS communication systems 508 that may communicate with the aircraft 100, one or more base stations (not illustrated) during a mission (e.g., one or more at a time), one or more ATCs 108 during a mission (e.g., one or more at a time), and other parties. The GCS 102 may include similar communication systems as described with respect to the aircraft 100. For example, the GCS 102 may include line of sight communication systems, satellite communication systems, and cellular communication systems. The GCS 102 may also include VHF radio communication systems. The GCS 102 may communicate with the aircraft 100, base stations, and/or ATC 108 using one or more of the above communication systems. For example, the GCS 102 may communicate with the aircraft 100 via a data connection and/or via a radio relay. The GCS 102 may receive data acquired by the aircraft 100 (e.g., sensor data, navigation data, comm. data, and other data). The GCS 102 may also receive validation data generated by the aircraft 100.

The GCS 102 may monitor the aircraft 100 and/or control operation of the aircraft 100. The GCS 102 may send commands (e.g., operator/autopilot commands) to the aircraft 100 that control the aircraft 100. For example, the GCS 102 may send an abort command to the aircraft 102. The GCS 102 includes other GCS systems, devices, and modules 510 that provide the functionality described herein, along with additional functionality associated with the GCS 102. For example, the other GCS systems, devices, and modules 510 may provide path planning functionality and other flight management system functionality for the aircraft 100.

In some implementations, the GCS 102 may include components (e.g., operator I/O 500) that are dedicated to generating the landing validation interface. For example, the GCS 102 may include one or more displays and/or operator controls that are dedicated to displaying a landing validation GUI and receiving landing validation commands (e.g., a landing abort command). In other implementations, the landing validation interface may be implemented on multiuse components that provide additional functionality in the GCS 102 for other operations.

FIG. 6 illustrates example validation system components (e.g., validation system modules) included in the aircraft 100 and the GCS 102. In FIG. 6, the aircraft validation system 110-1 and the GCS validation system 110-2 include aircraft validation system modules and GCS validation system modules, respectively. For example, in FIG. 6, the aircraft validation system 110-1 includes image acquisition and processing modules 600 (hereinafter "image processing modules 600"). The image processing modules 600 may acquire and process images, as described herein. The image processing modules 600 may also generate the validation data. In some implementations, the aircraft validation system 110-1 may include sensor data acquisition and processing modules 602 (referred to herein as "sensor data processing modules 602"). The sensor data processing modules 602 may acquire sensor data, such as orientation data. The image processing modules 600 may generate landing validation data based on the acquired/processed sensor data and the camera-IMU calibration data.

In some implementations, the aircraft validation system 110-1 may include additional modules 604 that provide additional functionality associated with the aircraft validation system 110-1. For example, the aircraft validation system 110-1 may include modules that are configured to abort the landing. In some implementations, the aircraft validation system 110-1 may include modules that automatically abort a landing (e.g., without communication with the GCS 102).

In FIG. 6, the GCS 102 may receive the landing validation data via the GCS communication system 508. The GCS validation system 110-2 may provide a validation interface to the operator/pilot via the GCS operator I/O 500. For example, the GCS validation system 110-2 may render one or more validation GUIs 606 on a display. As another example, the GCS validation system 110-2 may control additional/alternative validation interface components 608, such as speakers and haptic feedback that provide additional/alternative validation interfaces. In some implementations, the remote operator I/O 500 may include validation controls 612 (e.g., landing validation specific controls), which may be used by the remote operator to instruct the aircraft 100 to abort the landing.

The aircraft 100 may implement the abort commands and other commands (e.g., continue commands). For example, the FMS 406 and/or the flight control system 408 may implement the abort command. In a specific example, the FMS 406 and/or flight control system 408 may implement a missed approach plan/procedure described herein.

In some implementations, the landing validation interface may be enabled/disabled by the remote operator. For example, the landing validation interface may include an enable/disable input (e.g., a button input or touchscreen input) for enabling and disabling the landing validation functionality on the aircraft 100 and/or at the GCS 102.

The systems, modules, and other components included in the aircraft 100 and GCS 102 described herein may be implemented by hardware/software components (e.g., one or more computing devices) that provide the described functionality. In some implementations, the various hardware components (e.g., electrical and/or mechanical hardware components) and software components may be retrofitted onto an existing aircraft in order to provide the aircraft functionality described herein. Additionally, or alternatively, the various hardware/software components may be integrated into the aircraft during manufacture. The functional block diagrams illustrated herein are meant to represent example functionality associated with the aircraft 100, GCS 102, and other systems described herein. As such, the aircraft 100, GCS 102, and other systems may be implemented in a variety of different ways with different hardware/software configurations. In FIGS. 4-6, the aircraft validation system 110-1 may be implemented on one or more of the existing aircraft computers. Similarly, the GCS validation system 110-2 may be implemented on one or more existing GCS computers.

In some implementations, the landing validation functionality described herein may be provided as software for implementation on a new/retrofitted aircraft. For example, the landing validation functionality may be provided as a computer-readable medium including instructions that cause the computing devices in the aircraft 100 and/or GCS 102 to provide the landing validation functionality.

Figure 8:
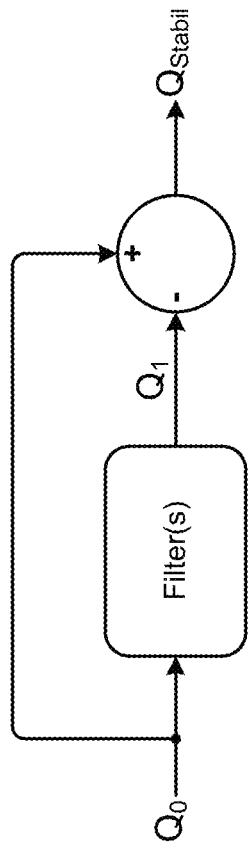
FIG. 8 illustrates a diagram describing an example method for image stabilization.
Figure 7:
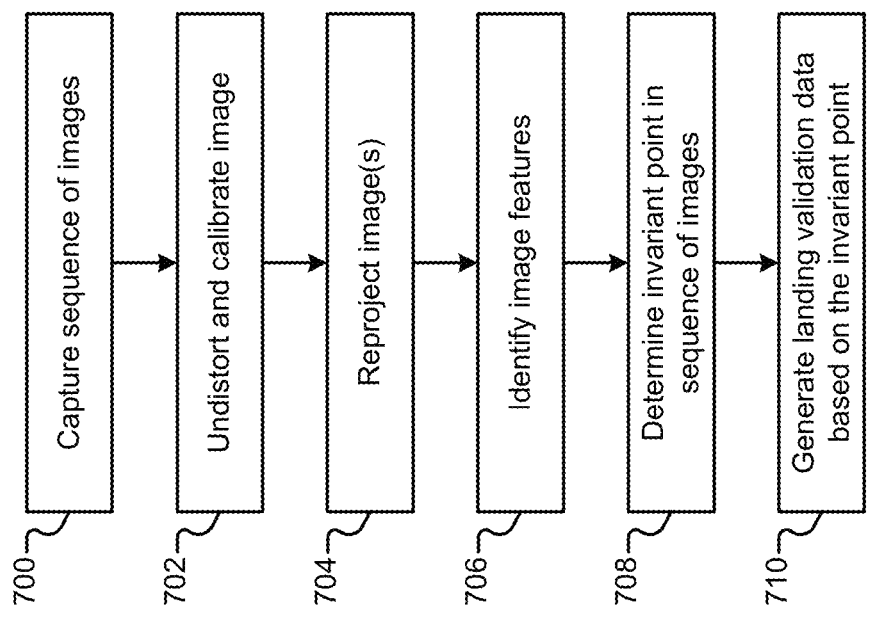
FIG. 7 illustrates an example method for determining an invariant point in a sequence of images.
Figure 9:
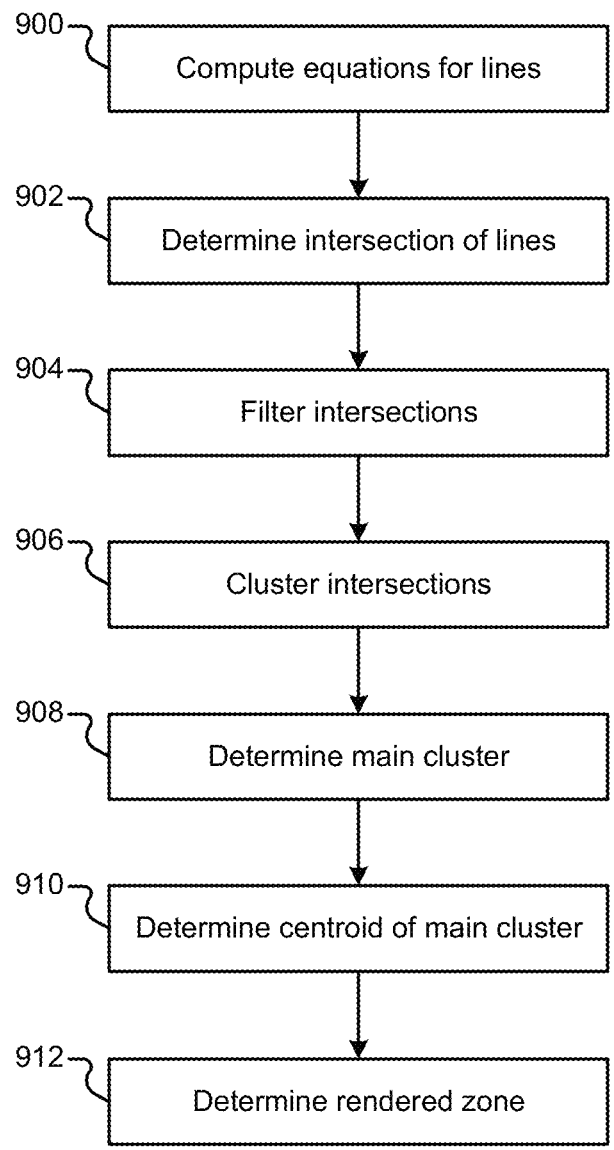
FIG. 9 illustrates an example method for determining an invariant point.

FIGS. 7-9 illustrate example image processing techniques that may be implemented by the validation system 110. In FIGS. 7-9, it may be assumed that the validation system 110 (e.g., image processing modules 600) performs the image processing on a sequence of images, such as a sequence of two images acquired as the aircraft is approaching the runway 106 for a landing. FIGS. 7-9 are described with reference to FIGS. 10A-14.

FIG. 7 illustrates an example method for determining an invariant point in a sequence of images. In block 700, the camera 112 captures a sequence of images. In block 702, the aircraft validation system 110-1 may perform preprocessing on the images. For example, the aircraft validation system 110-1 may undistort and/or calibrate the images. In some implementations, the aircraft validation system 110-1 may perform calibration operations, such as applying a transformation (e.g., geometric transformation) to the captured image(s) to correct for lens distortion and sensor alignment.

Figure 10A:
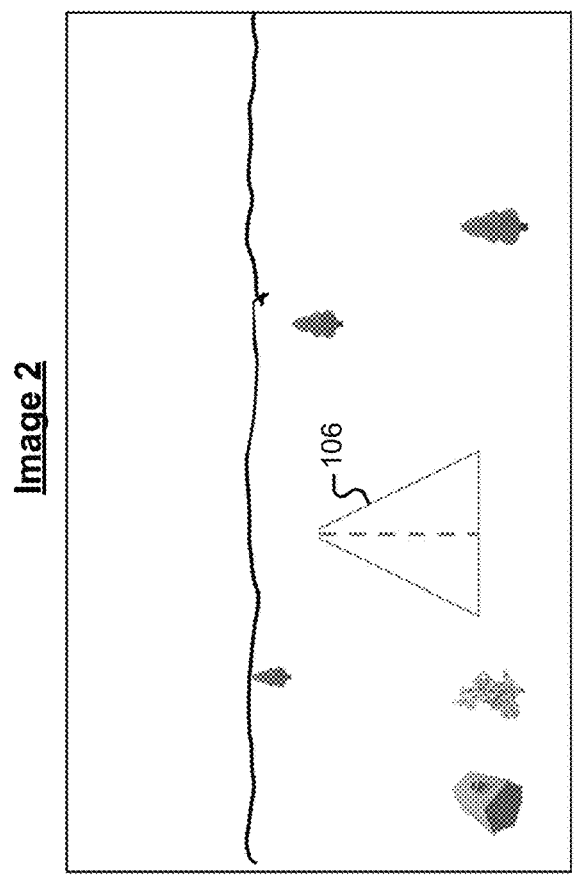
FIGS. 10A-10B illustrate an example sequence of captured images in which an aircraft is approaching the runway.
Figure 10B:
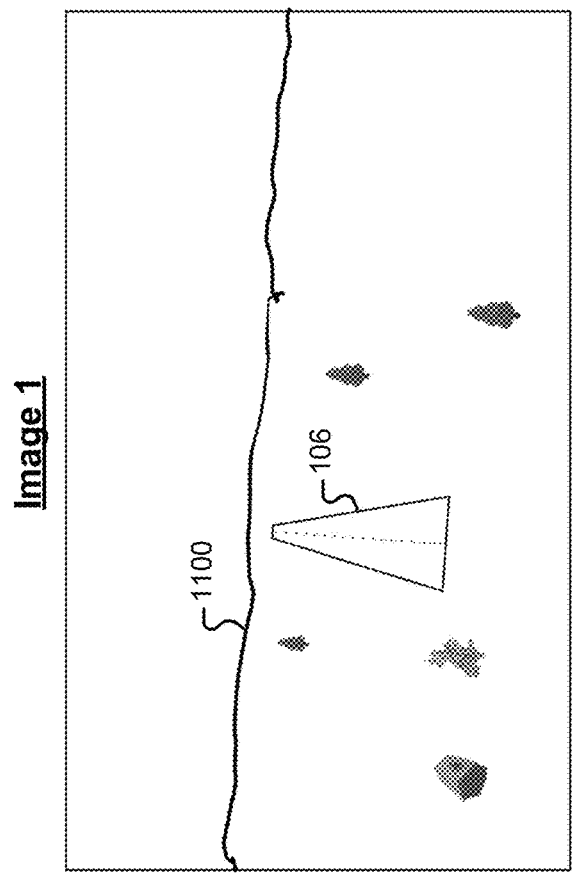

FIGS. 10A-10B illustrate an example sequence of captured images in which an aircraft is approaching the runway 106. In the second image ("Image 2") illustrated in FIG.

10B, the aircraft 100 is closer to the runway 106 and tilted relative to the previously acquired first image ("Image 1") illustrated in FIG. 10A.

Figures 11A, 11B:
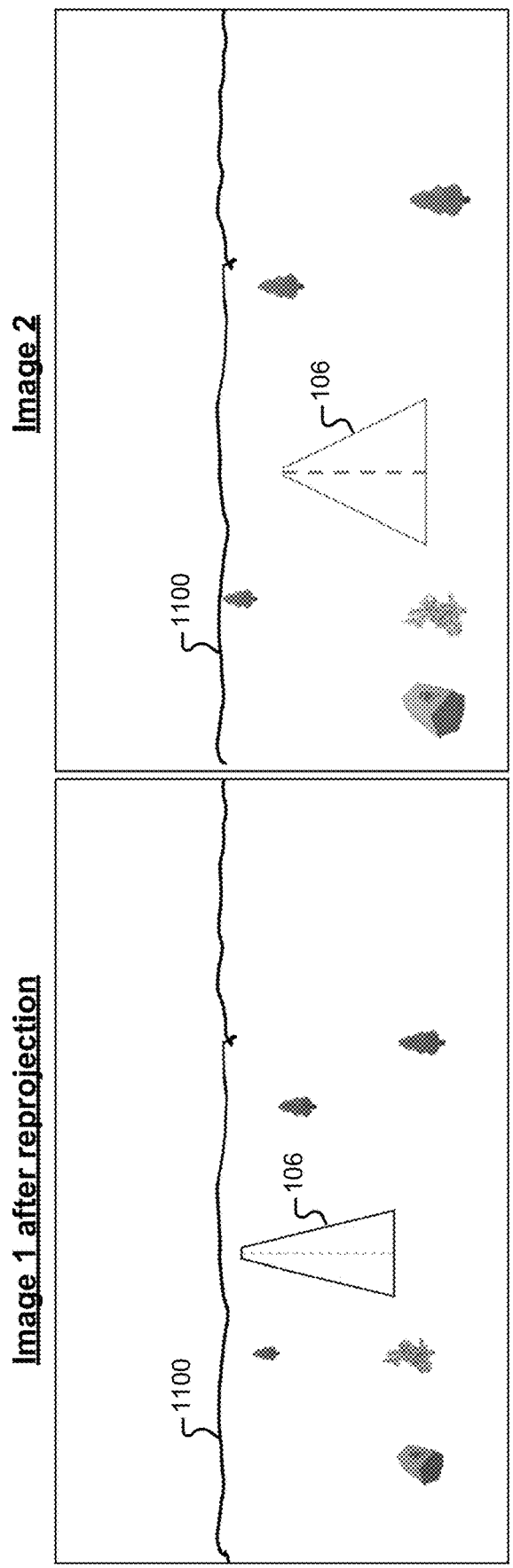
FIGS. 11A-11B illustrate example reprojection (e.g., reorientation) of an image.

In block 704, the aircraft validation system 110-1 reprojects one or more images. For example, the aircraft validation system 110-1 may reproject the first image to match the orientation of the second later acquired image. In one example, the aircraft validation system 110-1 may reproject the images such that the first and second images represent a view (e.g., a projection) of the runway and surrounding area from the same rotational orientation. FIG. 11A illustrates an example reprojection (e.g., reorientation) of image 1 next to image 2 of FIG. 11B. Note the change in orientation of the horizon 1100 and runway 106 of image 1 of FIG. 11A relative to image 1 of FIG. 10A.

In some implementations, the aircraft validation system 110-1 may reproject the images based on orientation data associated with the first and second images. As described herein, orientation data may be acquired from the INS (e.g., an IMU) at the time the images are acquired. In these implementations, the aircraft validation system 110-1 may acquire first orientation data at the time the first image is acquired. The aircraft validation system 110-2 may also acquire second orientation data at the time the second image is acquired. The aircraft validation system 110-1 may reproject the first image based on the difference between the first and second orientation data.

Figures 12A, 12B:
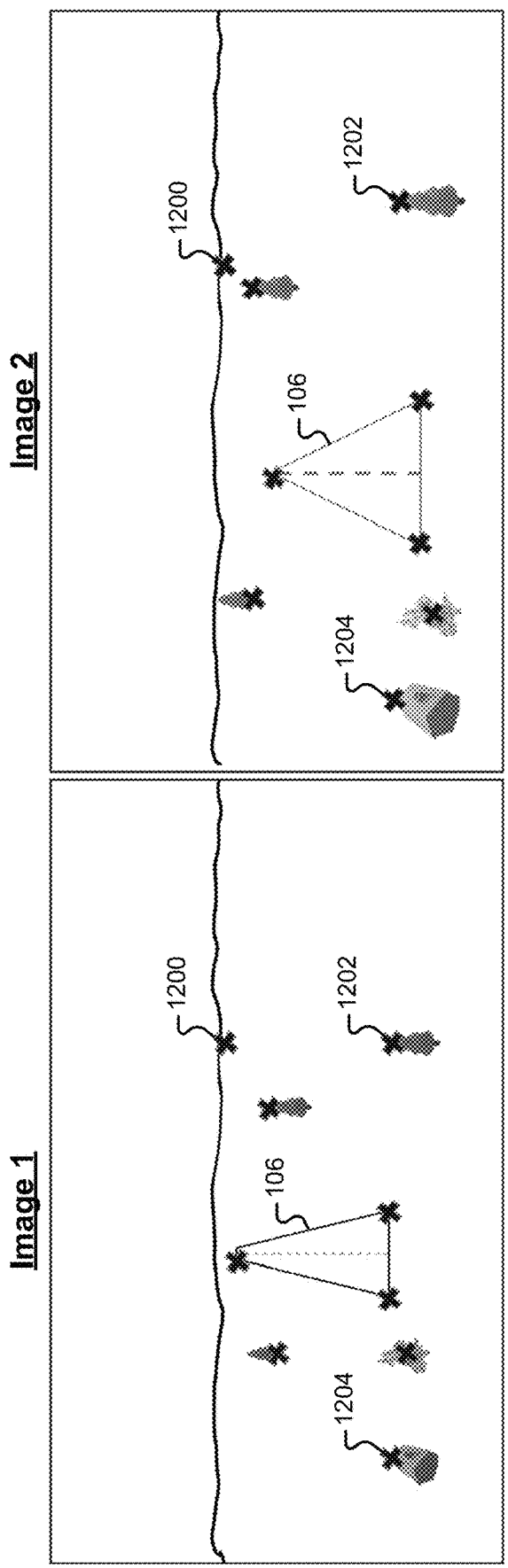
FIGS. 12A-12B illustrate the identification of common features in a sequence of images.

In block 706, the aircraft validation system 110-1 may identify common features in the images. FIGS. 12A-12B illustrate example common features detected in the images. Example common features include: 1) a point on the horizon 1200, 2) three points on the runway 106, 3) four features associated with trees (e.g., 1202), and 4) a feature associated with a building 1204. Note that the features have moved within the images due to movement of the aircraft 100 between the two images.

Figure 13:
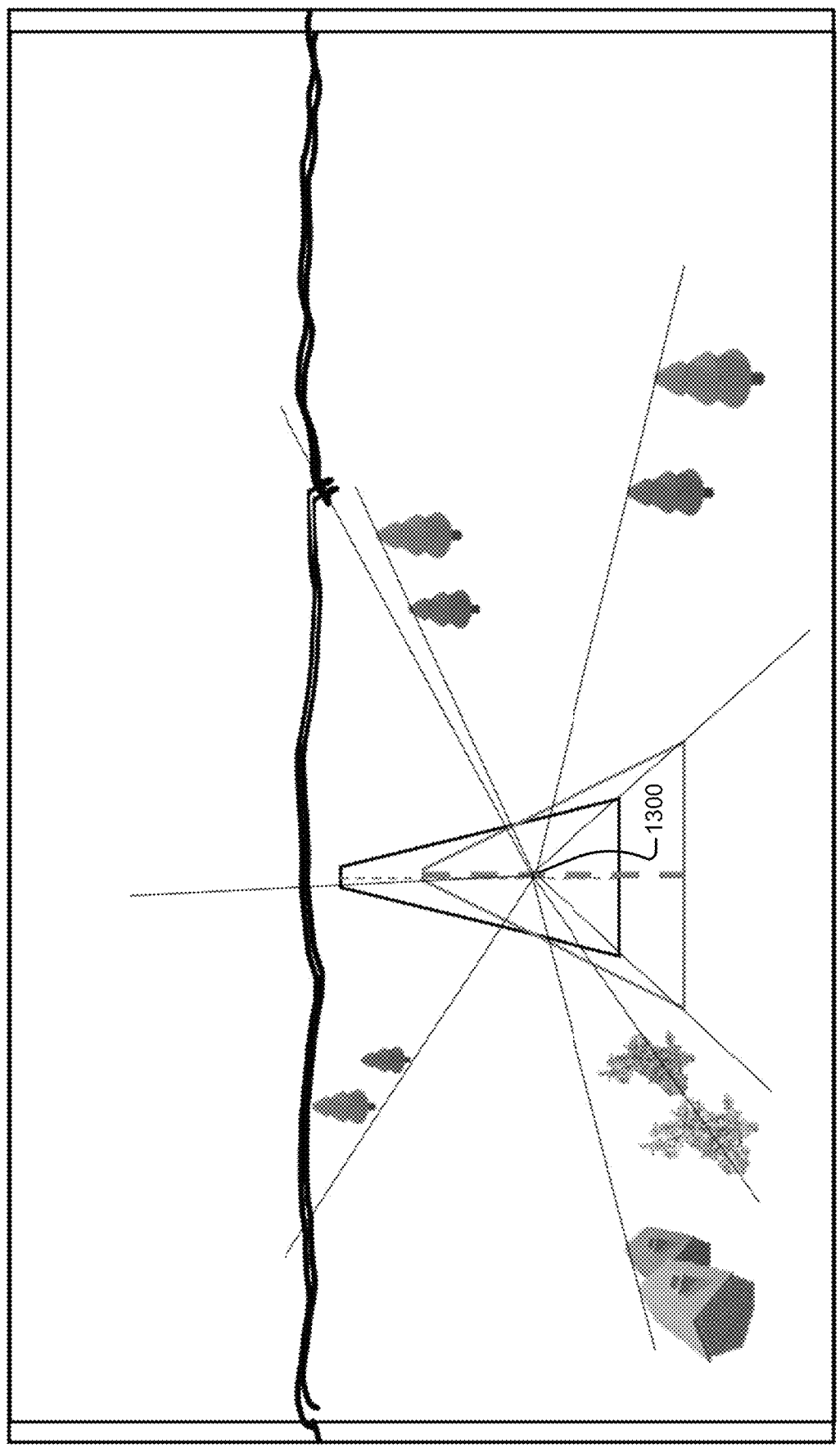
FIG. 13 illustrates an example calculation of an invariant point according to the method of FIG. 9.
Figure 14:
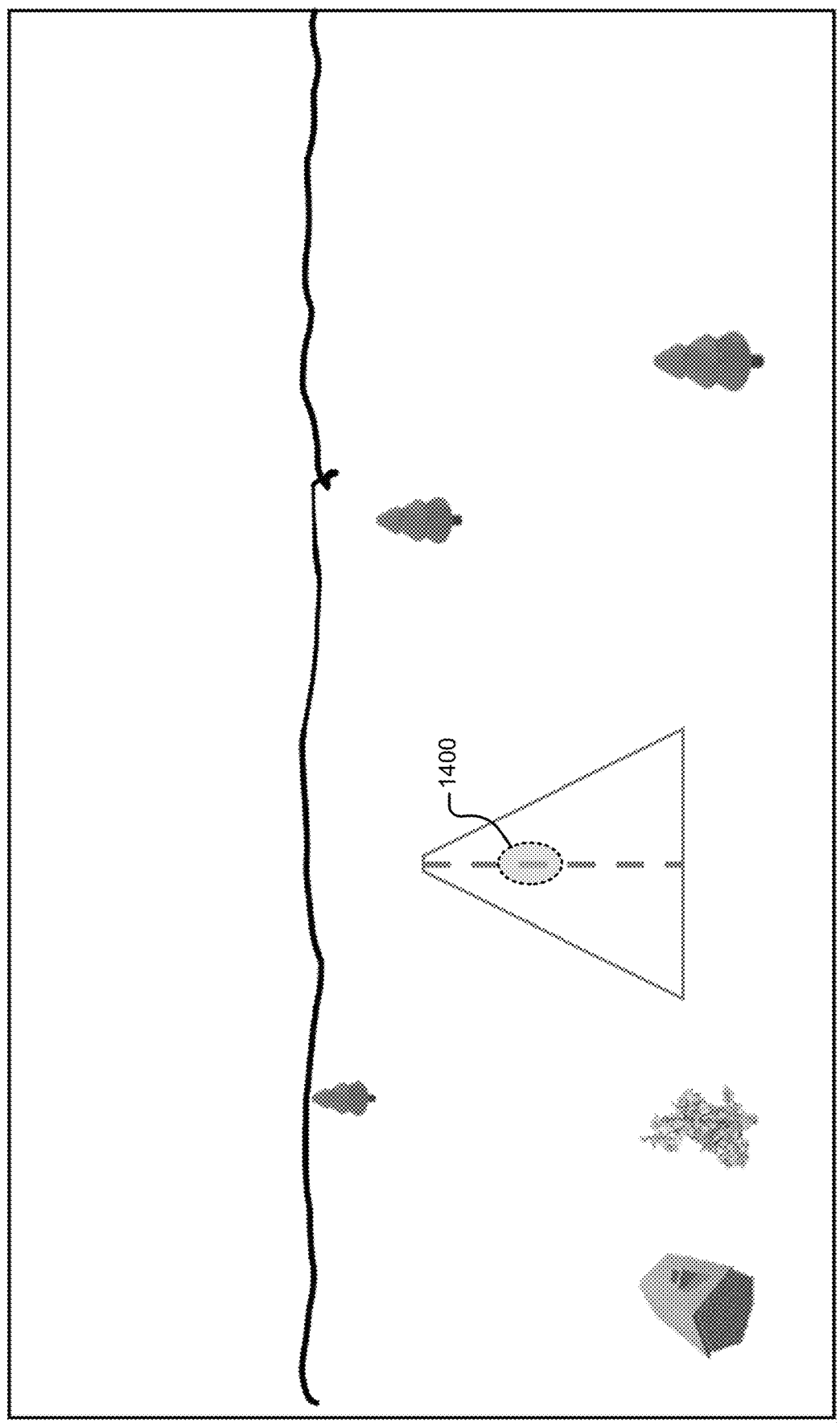
FIG. 14 illustrates an example determined predicted landing zone.

In block 708, the aircraft validation system 110-1 may determine the invariant point in the sequence of images. The invariant point may indicate the location to which the aircraft 100 is heading. The invariant point may be expressed in terms of image coordinates (e.g., image X, Y coordinates). FIG. 9 illustrates an example method for determining the invariant point. FIG. 13 illustrates an example calculation of the invariant point 1300 according to the method of FIG. 9. Based on a variety of factors, such as the resolution of the images, the lines may not all intersect in a single location. Solutions for the lack of intersection may be addressed in the method of FIG. 9 (e.g., blocks 904-910).

In block 710, the aircraft validation system 110-1 generates landing validation data based on the location of the invariant point in the image. For example, the aircraft validation system 110-1 may render a predicted landing zone 1400 onto the second image in the location of the invariant point 1300. Additionally, or alternatively, the landing validation data may include image coordinates (e.g., X, Y image coordinates) along with other values (e.g., a confidence value) indicating the level of certainty of the calculation. Note in the example FIGS. 10A-14, the rendered landing zone 14 is not centered within the image.

FIG. 8 illustrates a diagram describing an example method for image stabilization. A stabilized frame of reference may be computed by subtracting the high passed quaternion (1—low pass, low pass done using SLERP) of the transformation from the navigation frame to the body axis from the aircraft body axis' quaternion. The image may be stabilized using the method of FIG. 8 or by applying the homography corresponding to the change in rotation of the camera between the two frames.

FIG. 9 illustrates an example method for finding an invariant point in two images based on the movement of common features in the images. The method of FIG. 9 is described with reference to FIGS. 10A-14. In block 900, the aircraft validation system 110-1 may compute equations for lines for each feature. For example, for each feature, the aircraft validation system 110-1 may determine a line equation (e.g., y=ax+b) defined by points corresponding to the feature in each image. FIG. 13 graphically illustrates an example line calculation for each feature between the two images.

In block 902, the aircraft validation system 110-1 determines an intersection for the lines. In FIG. 13, the lines converge towards a location on the runway 106, although lines may converge in other manners in different scenarios. The aircraft validation system 110-1 may determine the invariant point based on the intersection of the lines. In FIG. 13, the invariant point 1300 may be located at the intersection. In scenarios where lines converge on a larger area (e.g., due to image resolution), the aircraft validation system 110-1 may process the data according to blocks 904-910 to determine the invariant point. For example, the aircraft validation system 110-1 may determine the invariant point by filtering the intersections, clustering the intersections, determining a main cluster of intersections, and determining a centroid of the main cluster.

With respect to block 904, multiple factors, such as image resolution, sensor noise, and error in feature matching may result in some lines that are incorrect. This may result in intersections that are far from the invariant point. In a visual representation, there may be one large cluster of intersections and some intersections farther away along erroneous lines. In block 904, the aircraft validation system 110-1 may filter out the erroneous intersections.

In block 906, once there is a set of intersections with most outliers removed, the intersections may be clustered (e.g., grouped) to determine the location of the invariant point. In one case, all of the intersection points may be on top of each other at the location of the invariant point. In other cases, there may be some dispersion. Depending on the clustering algorithm used (e.g., Density-based spatial clustering of applications with noise (DBSCAN) or K-means) and the values of the parameters, the validation system 110 may end up with multiple clusters. In some implementations, the clustering algorithm may also be used to filter out outliers. For example, DBSCAN may return a set of clusters and a set of outliers. In some implementations, blocks 904 and 906 may be performed together or iteratively.

In block 908, the aircraft validation system 110-1 may keep the main cluster with the most points. In block 910, the aircraft validation system 110-1 computes the centroid of the main cluster (e.g., the geometric center of all the points in this cluster), which may define the invariant point. In block 912, the aircraft validation system 110-1 may determine the rendered zone based on the processing performed in blocks 900-910 (e.g., see FIG. 14). For example, the aircraft validation system 110-1 may determine the rendered zone by fitting a shape (e.g., an ellipse) around the determined invariant point that represents an amount of uncertainty associated with the calculations. The aircraft validation system 110-1 and/or a remote operator may then determine whether to abort/continue the landing based on the calculated/rendered zone. The method of FIG. 9 illustrates only a single method for processing the captured images. As such, different algorithms and/or sequences of processing may be used in different implementations.

Figure 16:
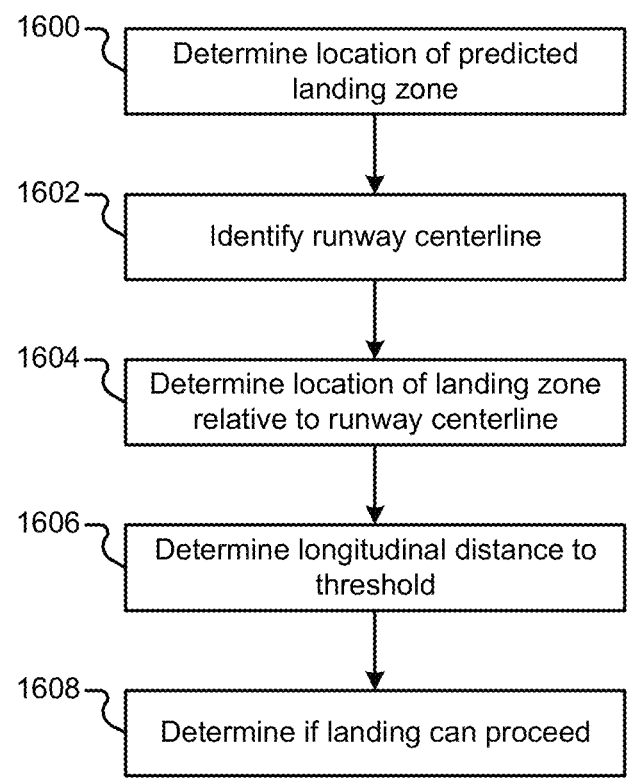
FIG. 16 illustrates an example method for automatically determining whether a landing should proceed based on the location of a predicted landing zone relative to an identified runway.

FIGS. 15-16 illustrate example features of the landing validation system 110 associated with runway element identification. In FIGS. 15-16, the aircraft validation system 110-1 may identify runway physical elements/features, such as a runway perimeter and runway markings including runway thresholds 1500, the runway centerline 1502, touch down zones, fixed distance marks, and runway letters/numbers. The runway physical features may also include runway edges 1504 (e.g., runway pavement edges). The aircraft validation system 110-1 may identify runway physical features in the images using one or more detection algorithms, such as line detection algorithms, edge detection algorithms, corner detection algorithms, blob detection algorithms, etc. The aircraft validation system 110-1 may employ a variety of techniques to detect features, such as machine learning techniques, deep learning techniques, deep neural networks, object detection frameworks (e.g., Viola-Jones), and other techniques (e.g., Hough transformation for line detection, Haar features, histogram of oriented gradients, etc.).

In some implementations, the validation system 110 may use alternate techniques for estimating one or more invariant components of the scene. For example, alternate techniques for estimating the invariant components of the scene may include optical flow techniques. In this approach, the motion of points in the scene may be determined by optical flow vectors, which may relate the position of a point in a prior image to its location in the current image. Optical flow may be computed sparsely (for certain points in the image that are expected to be well-tracked from frame-to-frame), or densely where the flow-field is estimated for every pixel in the input image. Methods for optical-flow estimation may include that of Lucas-Kanade for sparse feature-associations and Farnebeck for dense estimates. Additionally, the validation system 110 may use deep-learning approaches to flow estimation, such as FlowNet, SpyNet, and/or others. In both cases (e.g., sparse or dense), the frame-to-frame feature correspondence of scene elements may be computed, and this may be the basis for determining the velocity vector.

In some implementations, the aircraft validation system 110 may include runway data in the landing validation data. The runway data may include image data and other data that define the location of runway features in the image. For example, with reference to FIG. 15, the runway data may include an image of the runway annotated with a runway threshold 1500, runway edge(s) 1504, and runway centerline 1502. In some implementations, the runway features may be defined by other data structures, such as data structures that define the coordinates of the detected runway features in an X, Y image space (e.g., a sequence of points defining lines in the image space).

In some implementations, the GCS validation system 110-2 may include the runway features in the validation GUI. For example, as illustrated in FIG. 15, the GCS validation system 110-2 may include validation GUI elements that indicate various runway features. In FIG. 15, the validation GUI includes graphical overlays of the runway edges 1504, runway threshold 1500, and runway centerline 1502. In some implementations, the rendered zone 300 and/or runway features 1500, 1502, 1504 may be rendered in a manner that enhances the visibility of the detected features on the remote operator display 504. For example, the runway features may be colored (e.g., color coded) in a manner that enhances visibility for the remote operator.

In some implementations, the remote operator may make abort decisions based on the rendered predicted landing zone 300 and the rendered runway features 1500, 1502, 1504. For example, the remote operator may abort landing when the location of the rendered zone 300 is misaligned from the runway centerline 1502, near the runway edge 1504, and/or located too close to the threshold 1500 or before the threshold 1500.

FIG. 16 illustrates an example method for automatically determining whether a landing should proceed based on the location of a predicted landing zone relative to an identified runway. In the method of FIG. 16, the determination of whether to abort a landing may be based on the location of the predicted landing zone relative to the runway centerline and the runway threshold. The method of FIG. 16 is an example method. As such, additional/alternative landing criteria than those described with respect to FIG. 16 may be used.

In block 1600, the aircraft validation system 110-1 determines the location of the predicted landing zone. In block 1602, the aircraft validation system 110-1 identifies a runway centerline. In block 1604, the aircraft validation system 110-1 determines the location of the landing zone relative to the centerline. For example, the aircraft validation system 110-1 may determine whether the landing zone and the centerline intersect. As another example, the aircraft validation system 110-1 may determine a distance between the landing zone center and the runway centerline. In this example, a greater distance between the landing zone center and the runway centerline may indicate that the landing should be aborted. The offset from the centerline may be referred to as a "lateral error" in landing location.

In block 1606, the aircraft validation system 110-1 determines the longitudinal distance from the threshold to the predicted landing zone (e.g., the bottom edge or center of the predicted landing zone). The longitudinal distance from a desired landing point may be referred to as "longitudinal error" in landing location. In block 1608, the aircraft validation system 110-1 may determine whether to proceed with the landing or abort the landing based on the location of the predicted landing zone relative to the runway centerline and/or the runway threshold (e.g., based on lateral error and/or longitudinal error). Although the aircraft validation system 110-1 may implement the method of FIG. 16, the operations described in FIG. 16 may be performed by the aircraft 100 and/or the GCS 102 to different extents, depending on the implementation.

The following description and equations are directed to example calculations that may be implemented by the validation system 110 to determine the invariant point. Let $\underline{X}_{CS}^{i,1}=[X^{i,1}, Y^{i,1}, Z^{i,1}]^T$ be the position of feature i in the stabilized camera frame at time 1 and $\underline{X}_{CS}^{i,2}$ be the position of the same feature i at time 2. Feature i is positioned at pixel $$\underline{x}^{i,1} = \left[x^{i,1}, y^{i,1}\right] = \left[f\frac{x^{i,1}}{z^{i,1}}, f\frac{y^{i,1}}{z^{i,1}}\right]^T$$

at time 1 and at location $$\underline{x}^{i,2} = \left[x^{i,2}, y^{i,2}\right] = \left[f\frac{x^{i,2}}{z^{i,2}}, f\frac{y^{i,2}}{z^{i,2}}\right]^T,$$

where f is the focal length of the camera.

The equation of the line that is defined by the location of feature i at time 1 and at time 2 satisfies the equations: $y^{i,1}=a^i x^{i,1}+b^i$ and $y^{i,2}=a^i x^{i,2}+b^i$. Since the feature may be fixed in the real world and the camera has not rotated between the two frames, $$x^{i,2} = \left[ f\frac{X^{i,1} + V_x dt}{Z^{i,1} + V_z dt}, f\frac{Y^{i,1} + V_y dt}{Z^{i,1} + V_z dt} \right]^T,$$

were $[V_x, V_y, V_z]^T$ is the average velocity vector between time 1 and time 2 of the camera expressed in the camera frame and dt is the time interval between the two frames.

Solving for $a^i$ and $b^i$, the system may obtain $$a^i = \frac{Y^{i,1}V_y - Z^{i,1}V_z}{X^{i,1}V_x - Z^{i,1}V_z} \text{ and } b^i = \frac{X^{i,1}V_y - Y^{i,1}V_x}{X^{i,1}V_z - Z^{i,1}V_x}.$$

The lines formed by features i and feature j at time 1 and time 2 intersect at the point of coordinates $[x_{int}, y_{int}]^T$ such that $y_{int}=a^i x_{int}+b^i$ and $y_{int}=a^j x_{int}+b^j$, which solves into $$x_{int} = \frac{V_x}{V_z} \text{ and } y_{int} = \frac{V_y}{V_z},$$

which is the position of the projection of the velocity vector onto the image. This point may be invariant regardless of the features chosen, which may imply that the lines generated from the features' pixel positions in the stabilized image frame will intersect at the velocity vector.

Components of the aircraft 100 and the GCS 102 illustrated herein, such as the systems, modules, and data, may represent features included in the aircraft 100 and the GCS 102. The systems, modules, and data described herein may be embodied by electronic hardware, software, firmware, other aircraft avionics, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic/mechanical hardware and software that provides communication with a variety of different devices (e.g., displays, controls, etc.). For example, the I/O components may provide communication between other devices and the one or more processing units and memory components.

What is claimed is:

1. A system comprising:
   one or more cameras configured to attach to an aircraft and capture a plurality of images, wherein the plurality of images includes a first image including a runway and a subsequently captured second image including the runway; and
   an aircraft computing system configured to:
      identify common features in the first and second images;
      determine changes in locations of the common features between the first and second images;
      determine an image aspect associated with the first and second images, wherein the image aspect comprises at least one of: a location of an invariant region associated with the first and second images, an intersection of lines associated with each of the common features, a change in orientation of the aircraft between the first and second image, or a reprojection of one of the first or second images such that the first and second images represent a view of the runway from the same orientation;
      determine a predicted landing location of the aircraft in the second image based on the changes in locations of the common features; and
      abort landing on the runway based on the predicted landing location relative to the runway.

2. The system of claim 1, wherein the aircraft computing system is configured to abort landing by executing a missed approach flight procedure.

3. The system of claim 1, wherein the aircraft computing system is configured to:
   identify at least one of a runway centerline, a runway threshold, and a runway edge in one or more of the plurality of images; and
   abort landing on the runway based on the predicted landing location relative to at least one of the runway centerline, the runway threshold, and the runway edge.

4. The system of claim 1, wherein the aircraft computing system is configured to:

determine a location of an invariant region associated with the first and second images based on the changes in locations of the common features; and determine the predicted landing location in the second image based on the location of the invariant region.

5. The system of claim 4, wherein the aircraft computing system is configured to:

determine lines associated with movement of each of the common features; determine an intersection region based on a location where one or more of the lines intersect; and determine the location of the invariant region based on the location of the intersection region.

6. The system of claim 4, wherein the invariant region is defined as an invariant point.

7. The system of claim 1, wherein the aircraft computing system is configured to:

determine a change in orientation of the aircraft between the first and second images based on data acquired from one or more aircraft orientation sensors; and determine the predicted landing location based on the change in orientation of the aircraft.

8. The system of claim 7, wherein the aircraft computing system is configured to:

reproject one of the first and second images such that the first and second images represent a view of the runway from the same orientation; and determine the predicted landing location using the first and second images that represent a view of the runway from the same orientation.

9. The system of claim 1, further comprising a ground-based computing system, wherein the aircraft computing system is configured to transmit landing validation data to the ground-based computing system, wherein the landing validation data includes the second image and indicates the predicted landing location, and wherein the ground-based computing system is configured to render the predicted landing location on the second image based on the received landing validation data.

10. The system of claim 9, wherein the ground-based computing system is configured to:

receive a user-input landing abort command; and transmit the landing abort command to the aircraft, wherein the aircraft computing system is configured to receive the transmitted landing abort command and execute a missed approach flight procedure in response to the received landing abort command.

11. The system of claim 9, wherein the ground-based computing system is configured to:

automatically generate a landing abort command based on the predicted landing location relative to the runway; and transmit the landing abort command to the aircraft, wherein the aircraft computing system is configured to receive the transmitted landing abort command and execute a missed approach flight procedure in response to the received landing abort command.

12. The system of claim 9, wherein the ground-based computing system is configured to render the predicted landing location based on a level of uncertainty associated with determining the predicted landing location.

13. The system of claim 9, wherein the ground-based computing system is configured to:

render images received from the aircraft on a display; and render the predicted landing location over the images.

14. The system of claim 9, wherein the landing validation data includes image coordinates that define the predicted landing location.

15. The system of claim 9, wherein the landing validation data includes the predicted landing location rendered over the second image.

16. A non-transitory computer-readable medium comprising computer-executable instructions configured to cause one or more processing units of an aircraft to:

capture a plurality of images from one or more cameras attached to the aircraft, wherein the plurality of images includes a first image including a runway and a subsequently captured second image including the runway;

identify common features in the first and second images; determine changes in locations of the common features between the first and second images;

determine an image aspect associated with the first and second images, wherein the image aspect comprises at least one of: a location of an invariant region associated with the first and second images, an intersection of lines associated with each of the common features, a change in orientation of the aircraft between the first and second image, or a reprojection of one of the first or second images such that the first and second images represent a view of the runway from the same orientation;

determine a predicted landing location of the aircraft in the second image based on the changes in locations of the common features; and abort landing on the runway based on the predicted landing location relative to the runway.

17. The computer-readable medium of claim 16, further comprising instructions that cause the one or more processing units of the aircraft to abort landing by executing a missed approach flight procedure.

18. The computer-readable medium of claim 16, further comprising instructions that cause the one or more processing units of the aircraft to:

identify at least one of a runway centerline, a runway threshold, and a runway edge in one or more of the plurality of images; and abort landing on the runway based on the predicted landing location relative to at least one of the runway centerline, the runway threshold, and the runway edge.

19. The computer-readable medium of claim 16, further comprising instructions that cause the one or more processing units of the aircraft to:

determine a location of an invariant region associated with the first and second images based on the changes in locations of the common features; and determine the predicted landing location in the second image based on the location of the invariant region.

20. The computer-readable medium of claim 19, further comprising instructions that cause the one or more processing units of the aircraft to:

determine lines associated with movement of each of the common features;

determine an intersection region based on a location where one or more of the lines intersect; and determine the location of the invariant region based on the location of the intersection region.

21. The computer-readable medium of claim 19, wherein the invariant region is defined as an invariant point.

22. The computer-readable medium of claim 16, further comprising instructions that cause the one or more processing units of the aircraft to:

determine a change in orientation of the aircraft between the first and second images based on data acquired from one or more aircraft orientation sensors; and determine the predicted landing location based on the change in orientation of the aircraft.

23. The computer-readable medium of claim 22, further comprising instructions that cause the one or more processing units of the aircraft to:

reproject one of the first and second images such that the first and second images represent a view of the runway from the same orientation; and determine the predicted landing location using the first and second images that represent a view of the runway from the same orientation.

24. The computer-readable medium of claim 16, further comprising instructions that cause the one or more processing units of the aircraft to transmit landing validation data to a ground-based computing system, wherein the landing validation data includes the second image and indicates the predicted landing location, and wherein the computer-readable medium comprises instructions that cause an additional one or more processing units of the ground-based computing system to render the predicted landing location on the second image based on the received landing validation data.

25. The computer-readable medium of claim 24, further comprising instructions that cause the additional one or more processing units of the ground-based computing system to:

receive a user-input landing abort command; and transmit the landing abort command to the aircraft, wherein the instructions cause the one or more processing units of the aircraft computing system to receive the transmitted landing abort command and execute a missed approach flight procedure in response to the received landing abort command.

26. The computer-readable medium of claim 24, further comprising instructions that cause the additional one or more processing units of the ground-based computing system to:

automatically generate a landing abort command based on the predicted landing location relative to the runway; and transmit the landing abort command to the aircraft, wherein the instructions cause the one or more processing units of the aircraft computing system to receive the transmitted landing abort command and execute a missed approach flight procedure in response to the received landing abort command.

27. The computer-readable medium of claim 24, further comprising instructions that cause the additional one or more processing units of the ground-based computing system to render the predicted landing location based on a level of uncertainty associated with determining the predicted landing location.

28. The computer-readable medium of claim 24, further comprising instructions that cause the additional one or more processing units of the ground-based computing system to:

render images received from the aircraft on a display; and render the predicted landing location over the images.

29. The computer-readable medium of claim 24, wherein the landing validation data includes image coordinates that define the predicted landing location.

30. The computer-readable medium of claim 24, wherein the landing validation data includes the predicted landing location rendered over the second image.

\* \* \* \* \*